(12) United States Patent
Appu et al.

(10) Patent No.: US 10,453,169 B2
(45) Date of Patent: Oct. 22, 2019

(54) METHOD AND APPARATUS FOR MULTI FORMAT LOSSLESS COMPRESSION

(71) Applicant: Intel Corporation, Santa Clara, CA (US)

(72) Inventors: Abhishek R. Appu, El Dorado Hills, CA (US); Prasoonkumar Surti, Folsom, CA (US); Hiroshi Akiba, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/082,602

(22) Filed: Mar. 28, 2016

(65) Prior Publication Data

US 2017/0278215 A1 Sep. 28, 2017

(51) Int. Cl.
*G06T 1/60* (2006.01)
*G06T 9/00* (2006.01)

(52) U.S. Cl.
CPC . *G06T 1/60* (2013.01); *G06T 9/00* (2013.01)

(58) Field of Classification Search
CPC ........... G06T 1/60; G06T 15/005; G06T 1/20; G06T 17/05; G06T 1/0007; G06T 9/00; G06T 11/40; G06T 3/60; G06F 12/0875; G06F 12/0897; G06F 3/126; G06F 12/0811; G06F 17/30256; G06F 2212/401; G06F 2212/657; G06F 2212/1044; G06F 3/0608; G06F 12/084; G06F 12/0862; G06F 3/0638; G06F 11/1004; G06F 3/0673; G06F 3/064; G06F 2212/1024; G06F 12/0871; G06F 12/08; G09G 2360/121; G09G 5/363; G06Q 20/405
See application file for complete search history.

(56) References Cited

U.S. PATENT DOCUMENTS

| | | | |
|---|---|---|---|
| 6,359,625 B1 | 3/2002 | Perego | |
| 6,825,847 B1 * | 11/2004 | Molnar | G09G 5/02 345/555 |
| 7,719,540 B2 | 5/2010 | Piazza | |
| 9,053,040 B2 | 6/2015 | Surti | |
| 2006/0047916 A1 | 3/2006 | Ying et al. | |
| 2011/0243469 A1 * | 10/2011 | McAllister | G06T 9/00 382/239 |

(Continued)

OTHER PUBLICATIONS

Stephen Junkins, The Compute Architecture of Intel® Processor Graphics Gen9 Version 1.0, Aug. 14, 2015, pp. 1-22.

(Continued)

*Primary Examiner* — Xilin Guo
(74) *Attorney, Agent, or Firm* — Jaffery Watson Mendonsa & Hamilton LLP

(57) ABSTRACT

Embodiments provide for a graphics processing apparatus including a cache memory and logic coupled to the cache memory to compress color data output from the first cache memory. In one embodiment the cache memory is a render cache. In one embodiment the cache memory is a victim data cache. In one embodiment the first cache memory is a render cache coupled to a victim data cache and logic is configured to compress color data evicted from the render cache and the victim data cache. The compression can include a target compression ratio to which the data is to be compressed.

18 Claims, 19 Drawing Sheets

(56) References Cited

U.S. PATENT DOCUMENTS

| | | | |
|---|---|---|---|
| 2012/0213435 A1* | 8/2012 | Donovan | ............... G06T 9/004 |
| | | | 382/166 |
| 2014/0375665 A1 | 12/2014 | Surti et al. | |
| 2015/0264223 A1 | 9/2015 | Akenine-Moller et al. | |
| 2015/0379737 A1 | 12/2015 | Nilsson et al. | |
| 2017/0004069 A1* | 1/2017 | Li | .......................... G06F 12/08 |

OTHER PUBLICATIONS

PCT International Search Report and Written Opinion of the International Searching Authority for International Application No. PCT/US2017/017026, dated May 16, 2017, 13 pages.

International Preliminary Report on Patentability received for PCT Patent Application No. PCT/US2017/017026, dated Oct. 11, 2018, 12 pages.

Notice of Publication of Patent for Invention for Chinese International Application No. 201780013892.0. Publication No. CN 108701347 A, Published Oct. 23, 2018, 1 page.

* cited by examiner

METHOD AND APPARATUS FOR MULTI FORMAT LOSSLESS COMPRESSION

TECHNICAL FIELD

Embodiments generally relate to processing logic, including graphics processing logic. More particularly, embodiments relate to multi format lossless compression of graphics data.

BACKGROUND

With increasingly complex rendering and graphics processing operations requiring computationally heavy computing operations meeting memory bandwidth requirements can become challenging, as scaling memory bandwidth within a graphic processing device is non-trivial. In addition to, or as an alternative to increasing memory bandwidth within a graphics processing device, techniques have arisen to reduce the memory bandwidth requirements for certain operations and within certain components.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
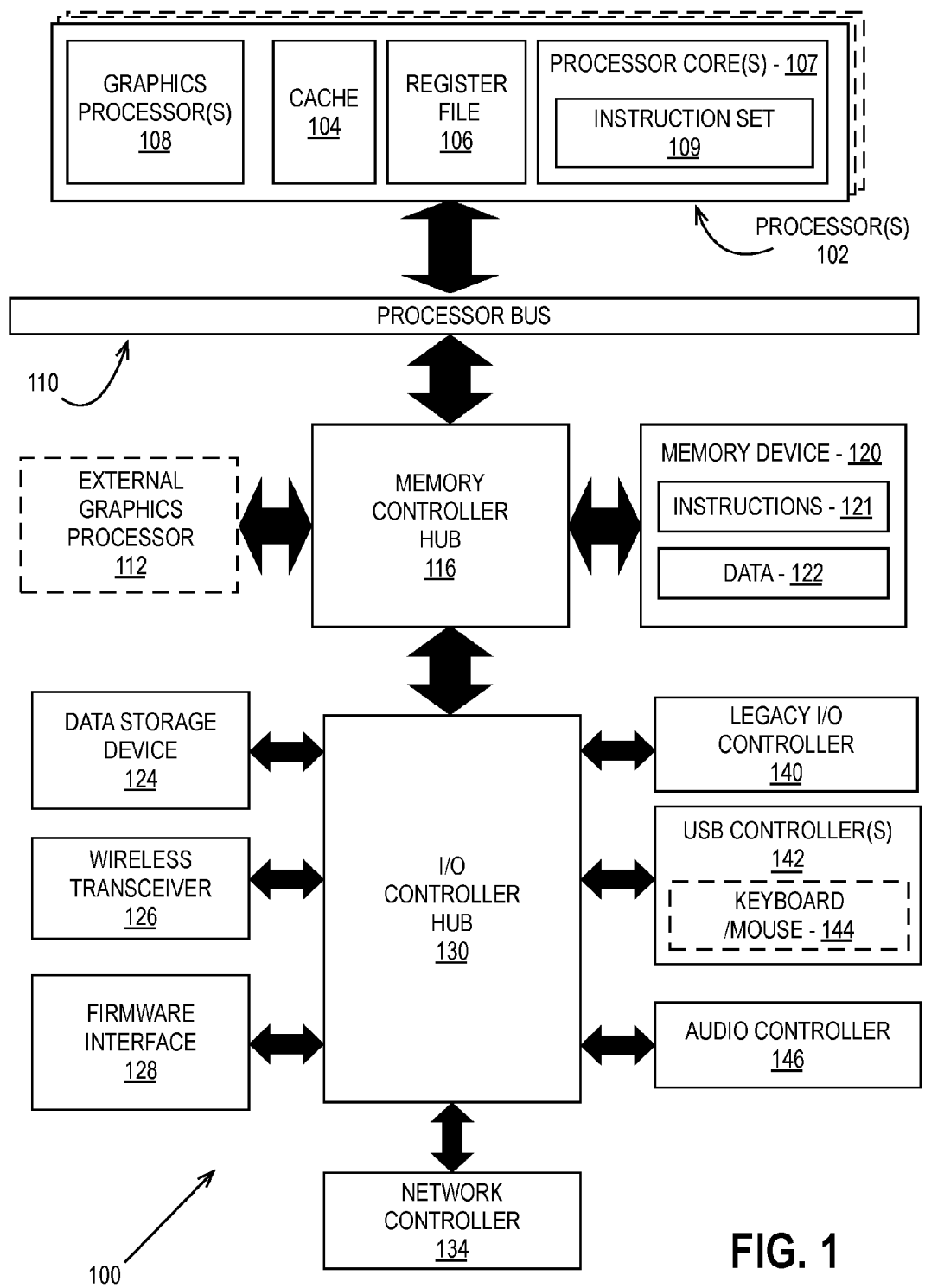
FIG. 1 is a block diagram of an embodiment of a computer system with a processor having one or more processor cores and graphics processors.

In rendering, an image is represented by primitives, such as triangles or other polygons. A render target is established in a frame buffer. The render target is a destination surface in memory where render results are written. The render cache is a cache in which pixel color and depth information is written prior to being written to memory and where the prior pixel destination attributes are read in preparation for blending and depth tests. Each read from and write to the render cache makes use of a memory interface bus that is used to interconnect various levels of cache memory with graphics processing elements. Reducing the bus bandwidth consumed by each read or write operation can result in a direct improvement in graphics processing and rendering performance.

Described herein is a method and apparatus to perform multi-format lossless compression of a render target stream as the stream is evicted from a render cache within a graphics processor. Such compression can result in write bandwidth savings during the eviction, as well as read bandwidth savings when sampling render target data, for example, in the case of dynamic textures. Additionally, read bandwidth savings are realized when blending is used during the rendering process.

In one embodiment, a victim cache is provided within the eviction path of a render cache to store modified (e.g., dirty) cache data that is evicted from the render cache during a write back to memory. The victim cache can cache partial cache line evictions or full cache line evictions. In addition to the performance improvements realized by the presence of the victim cache, a lossless compression algorithm is used to compress cache lines that are evicted from the victim cache and/or the render cache to reduce the size of the data during transmission to higher levels in the cache or memory hierarchy. Render target data written to higher levels of the cache and/or memory hierarchy remain compressed until the data is consumed by a graphics processing resource or read back into the render target cache. For example, compressed data is decompressed when loaded into the render target cache, when read as texture data by a sampler, when read for display by a display engine, or when read by execution resources executing a shader program that is performing a render target read.

While a render target cache will be described, the techniques described herein have generally applicability to data evicted or read from graphics processor cache memory. One embodiment has particular application to the scenario in which the cache line size is a multiple of the cache memory bus. In such embodiment, the compression is configured with a target compression rate such that the entire cache line can be transmitted during a single bus cycle. For example, given a 2:1 cache size to bus size ration, a compression target of 50% is specified such that an entire cache line may be transmitted during a single bus cycle. In such embodiment, a 50% write bandwidth reduction may be realized during the cache line eviction, and any subsequent read of the evicted data may realize a 50% read bandwidth reduction when reading the evicted data.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-19 provide specific details of the various embodiments. Although some of the following embodiments are described with reference to a graphics processor, similar techniques and teachings can be applied to other types of circuits or semiconductor devices, including general purpose processors or many integrated core processors, as the teachings are applicable to any processor or machine that manipulates or processes image or vertex data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
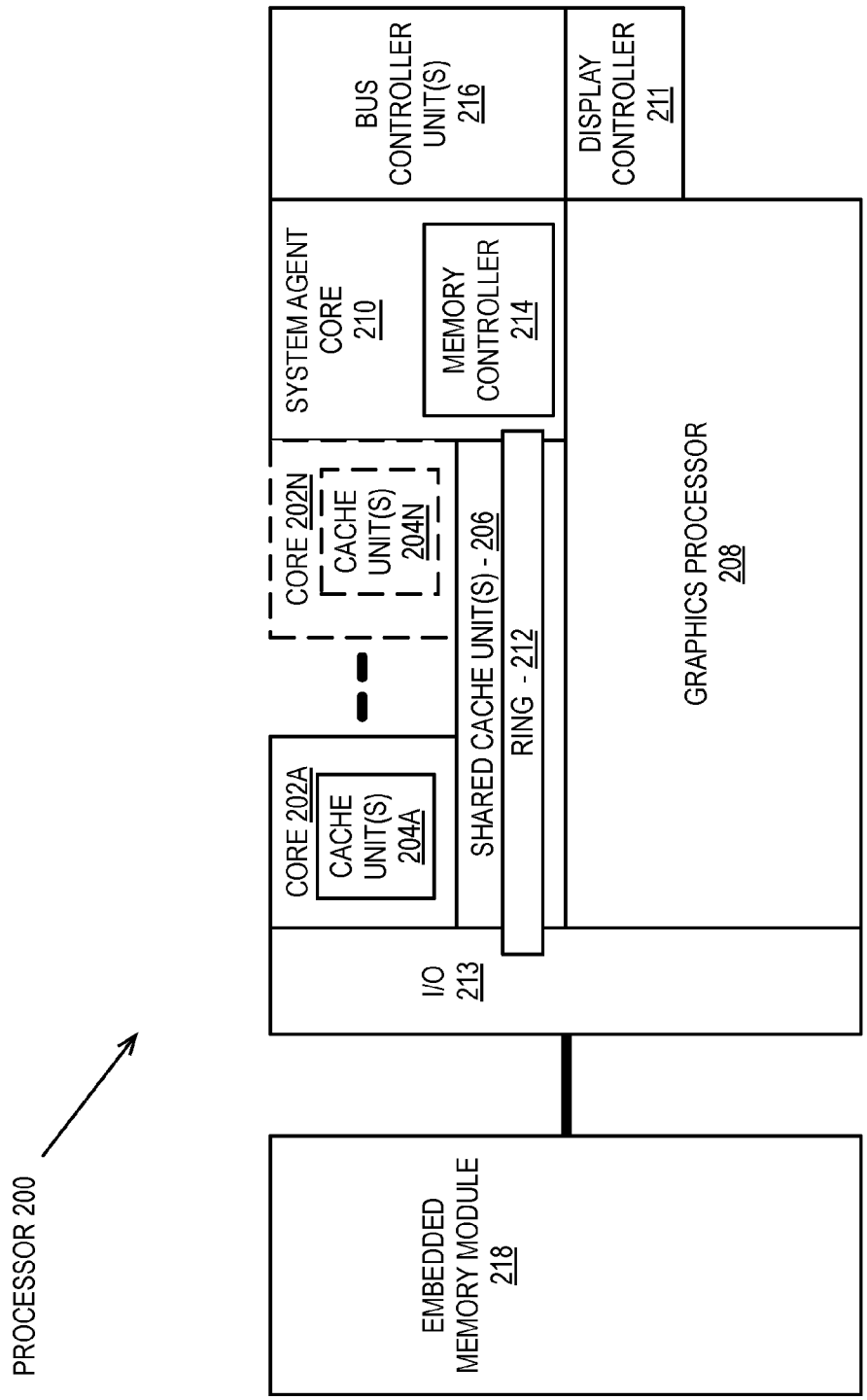
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
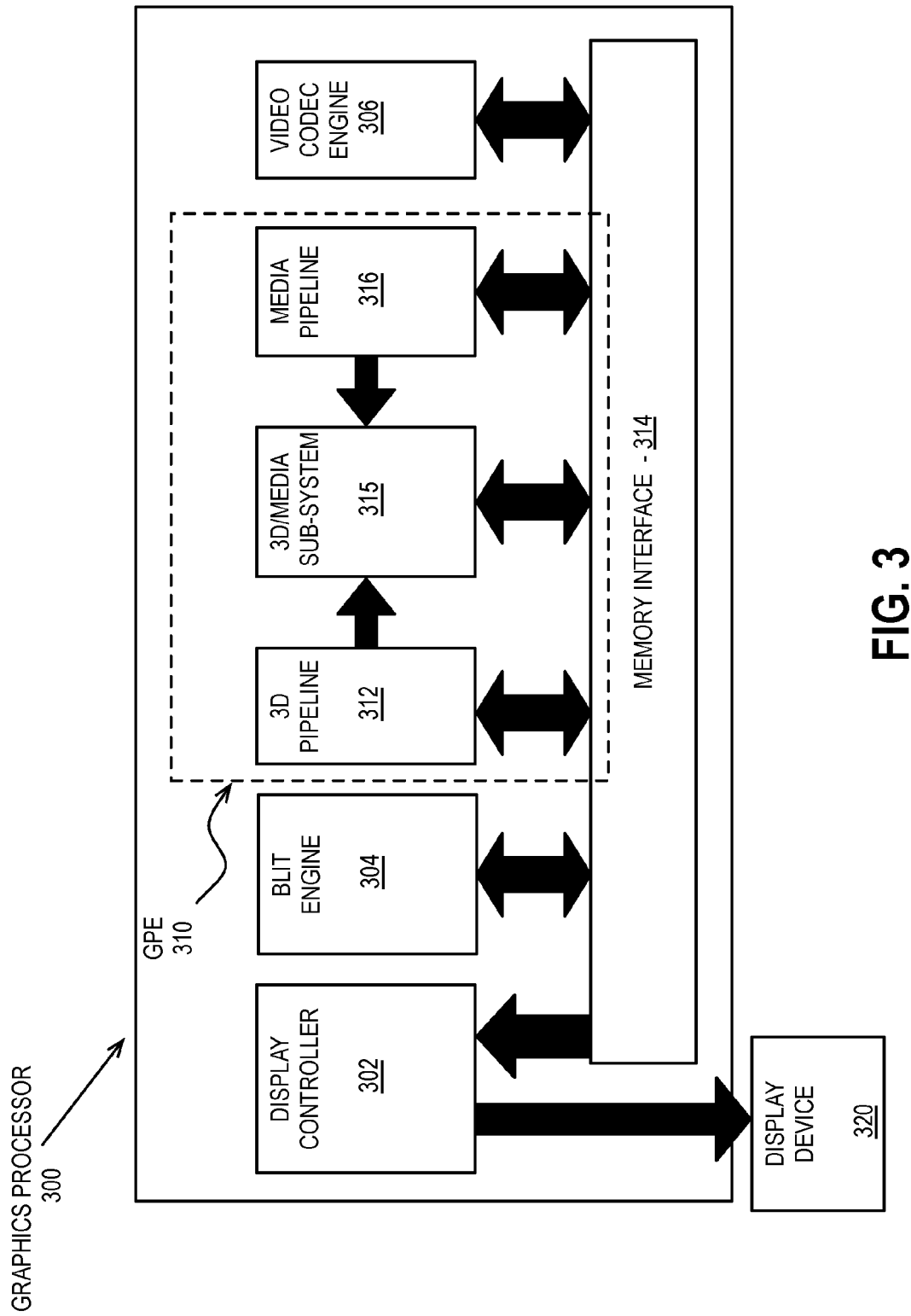
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
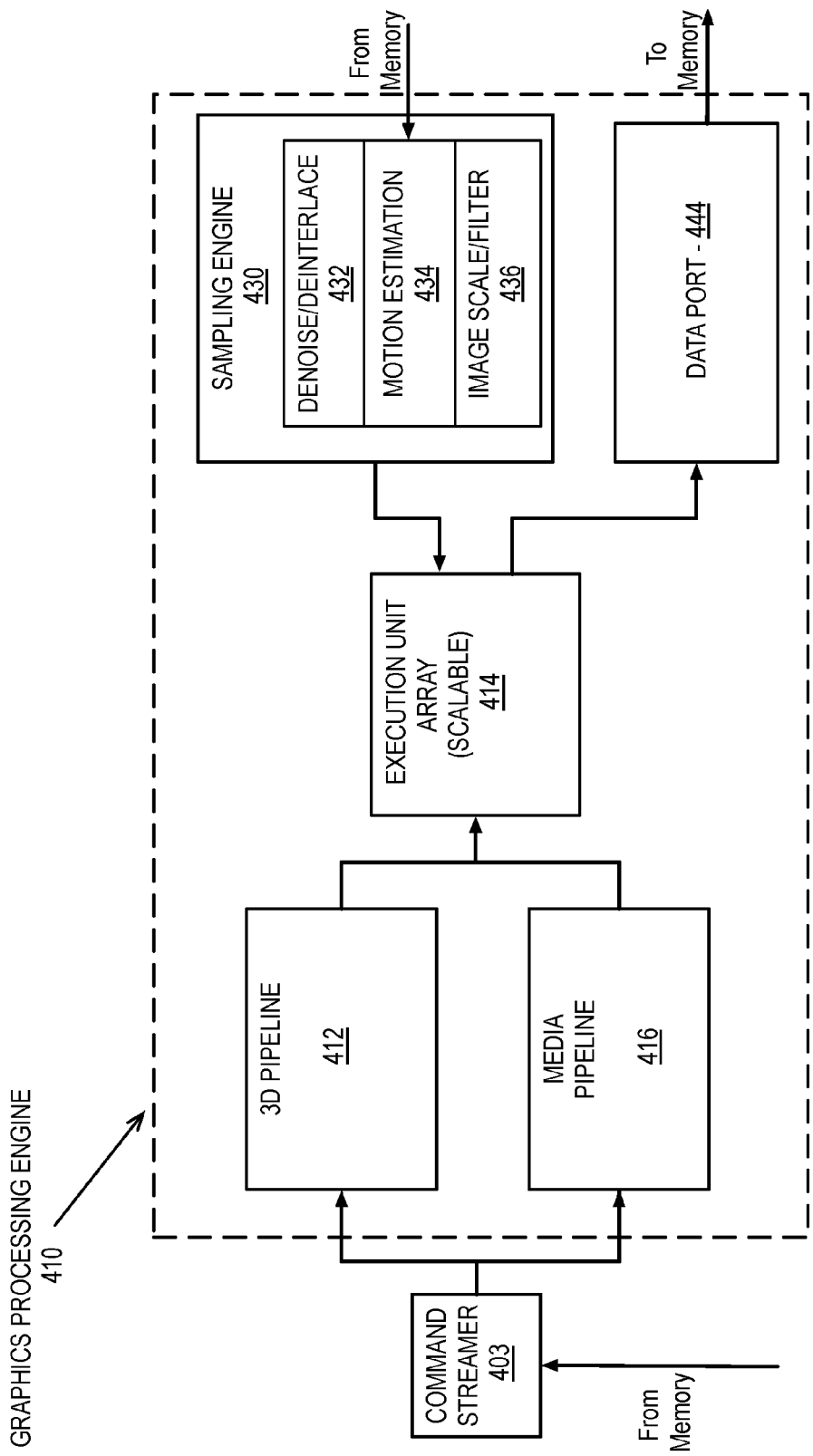
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
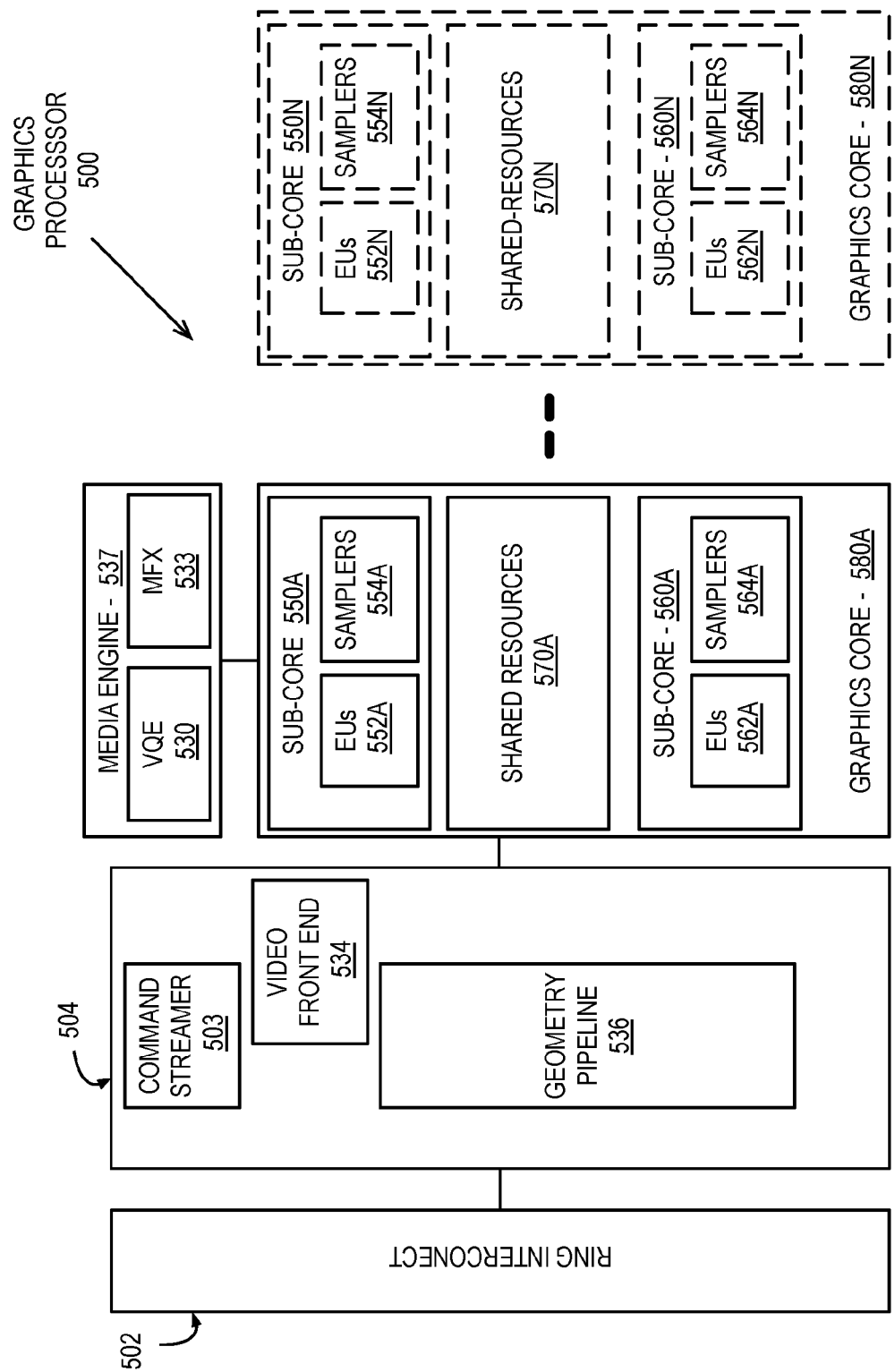
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
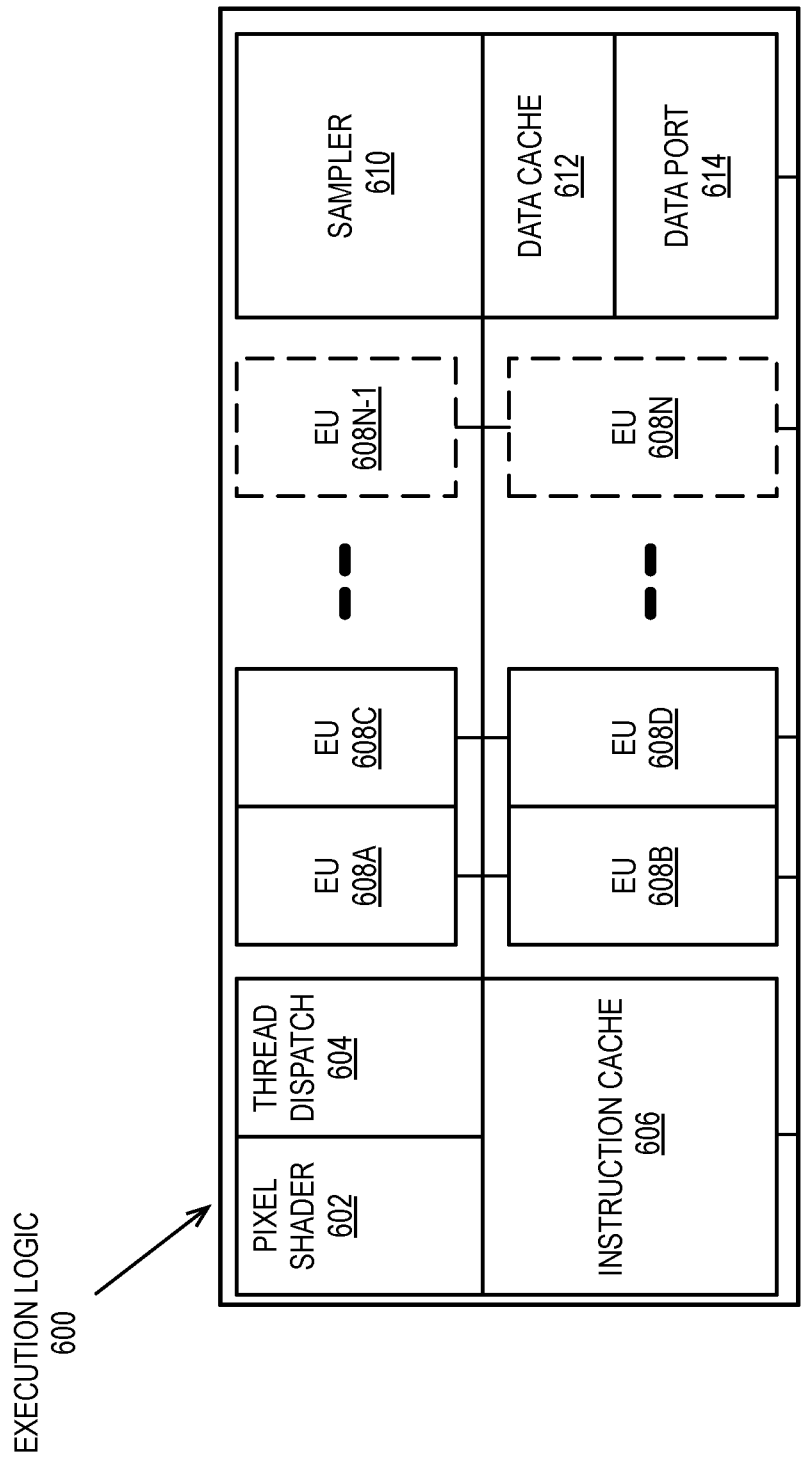
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
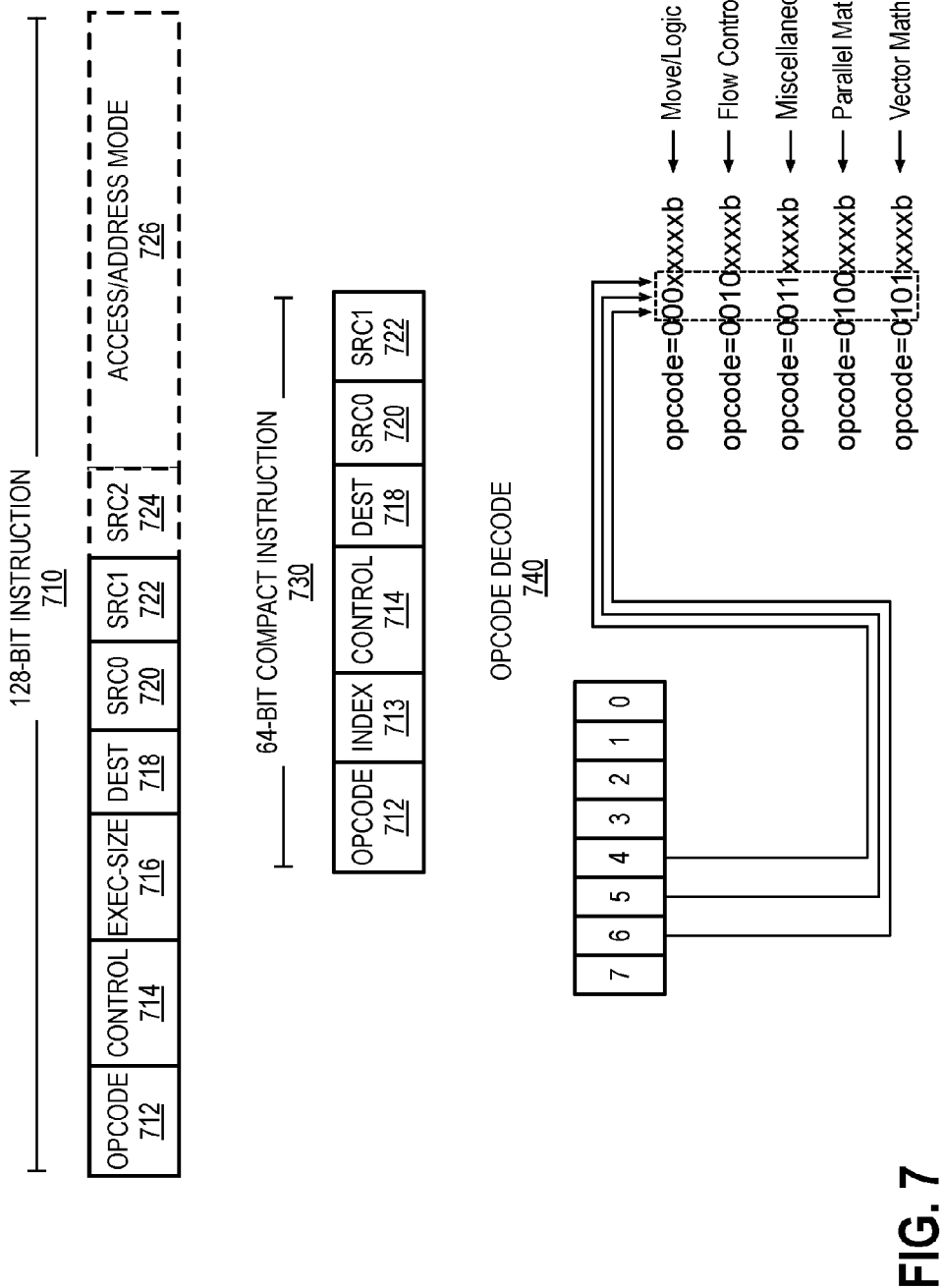
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
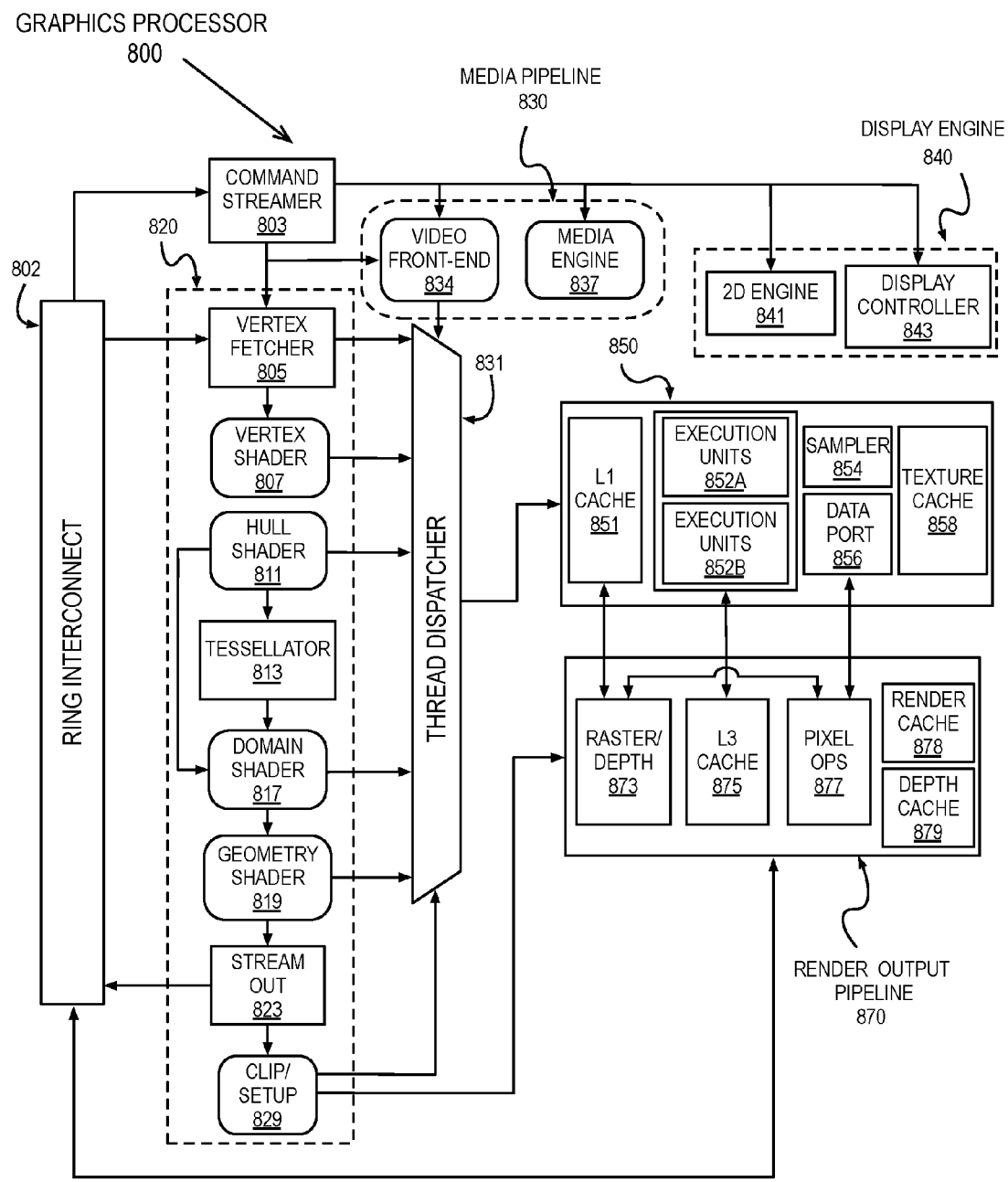
FIG. 8 is a block diagram of another embodiment of a graphics processor which includes a graphics pipeline, a media pipeline, a display engine, thread execution logic, and a render output pipeline.
Figure 9:
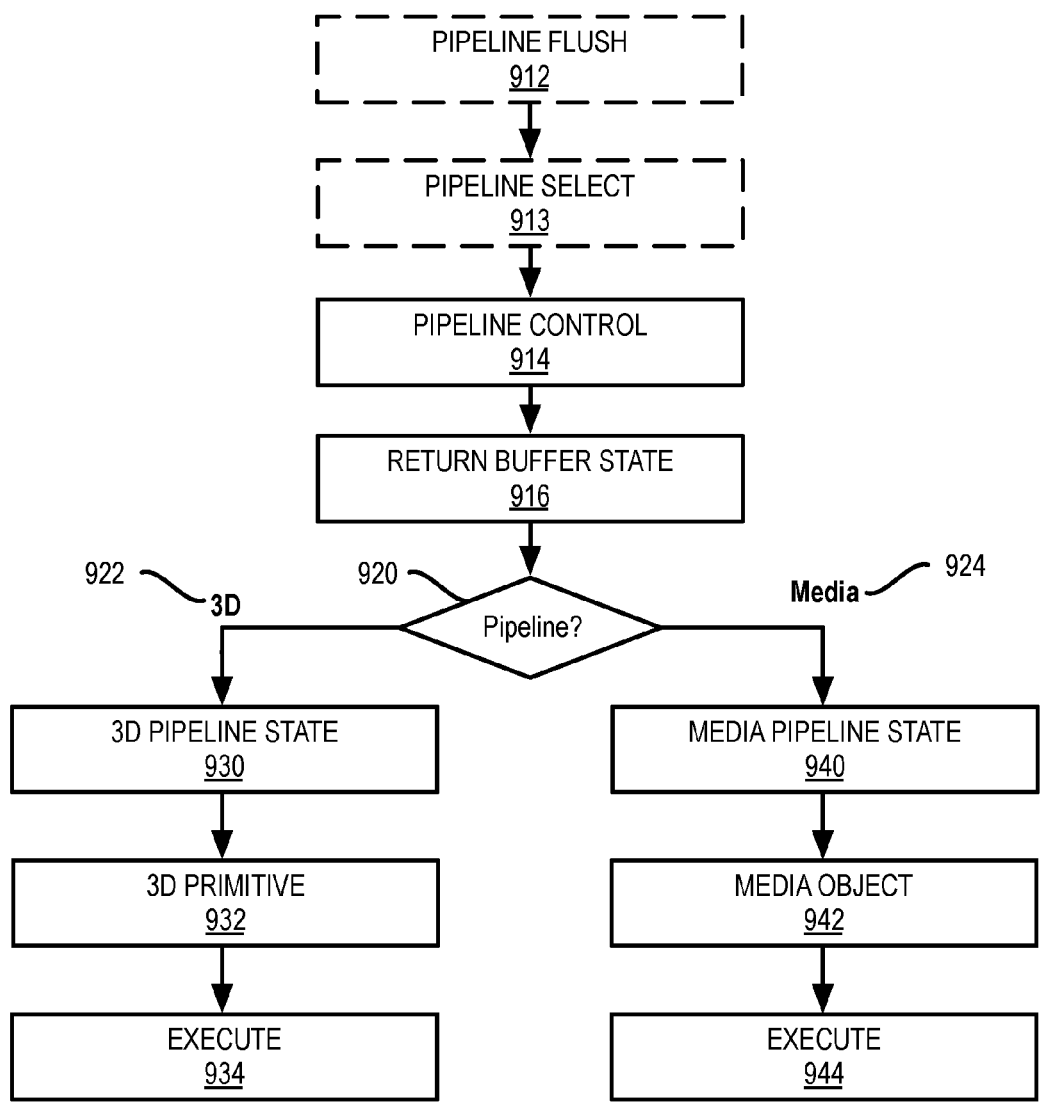
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a depth test component and rasterizer 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
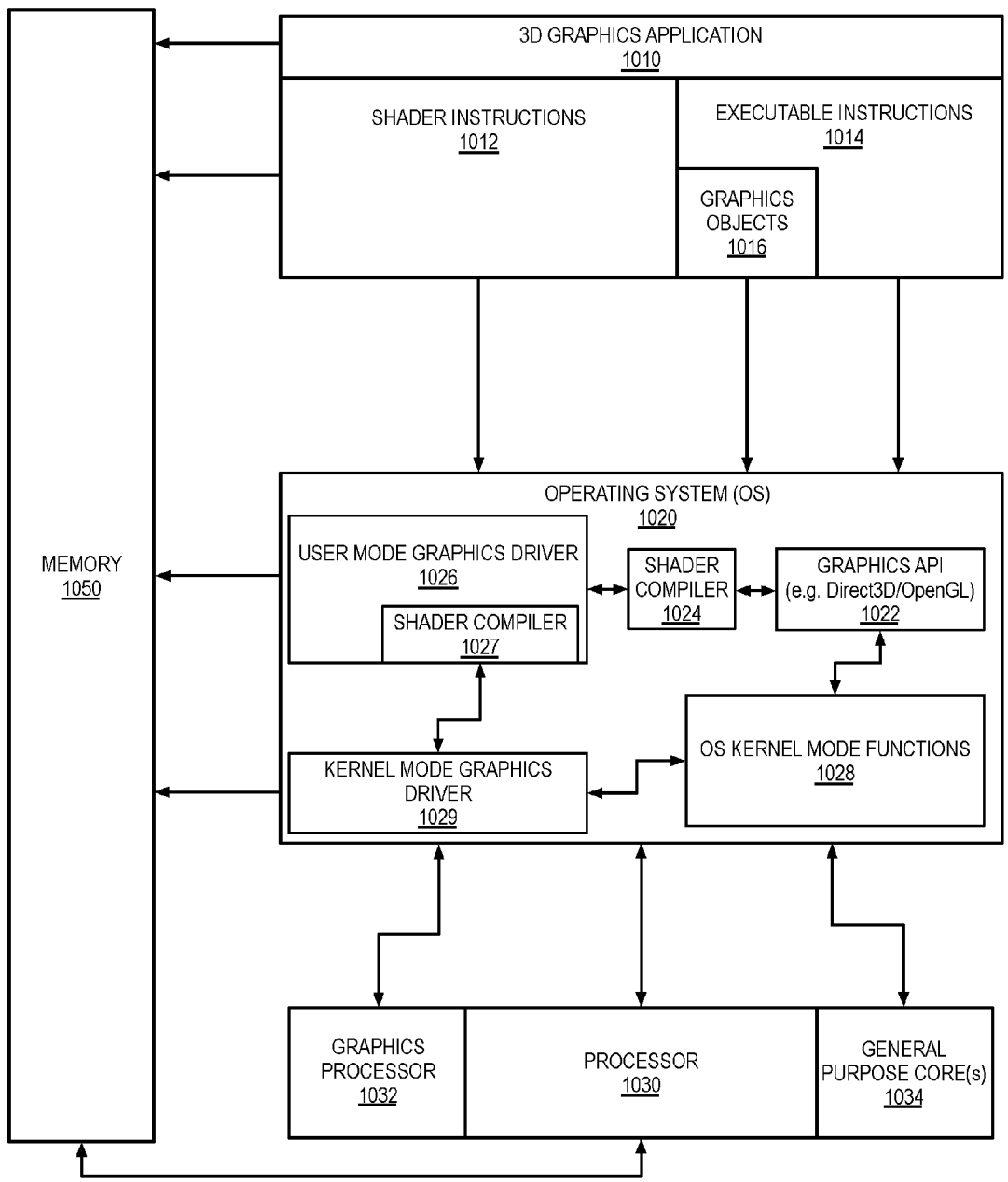
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
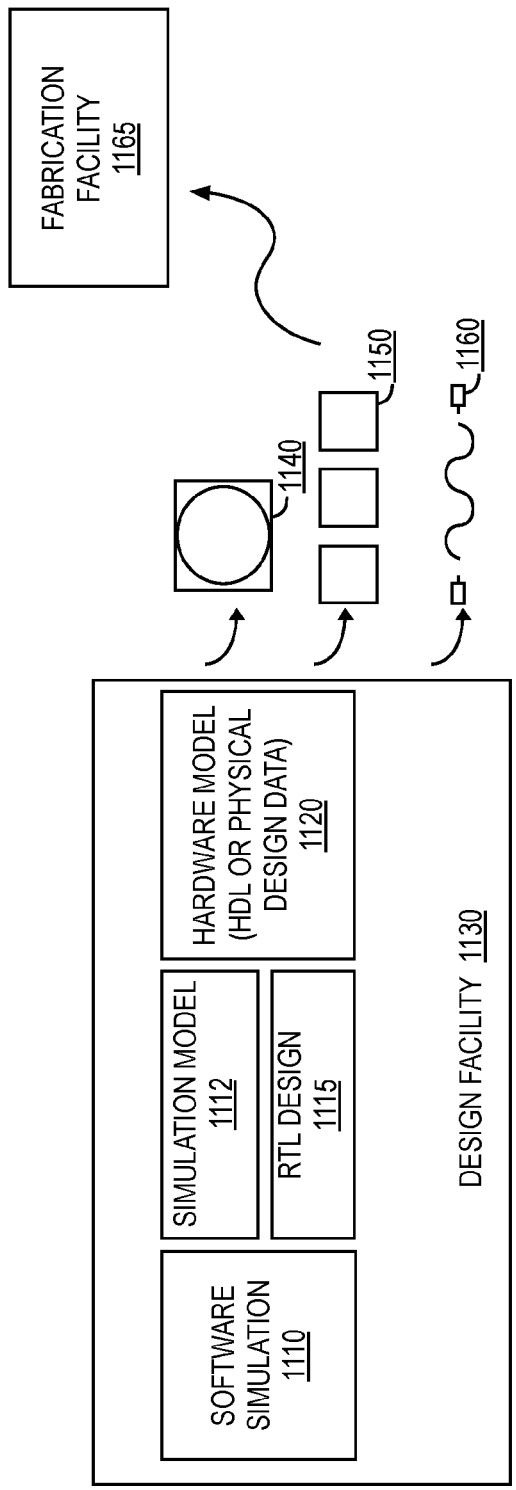
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
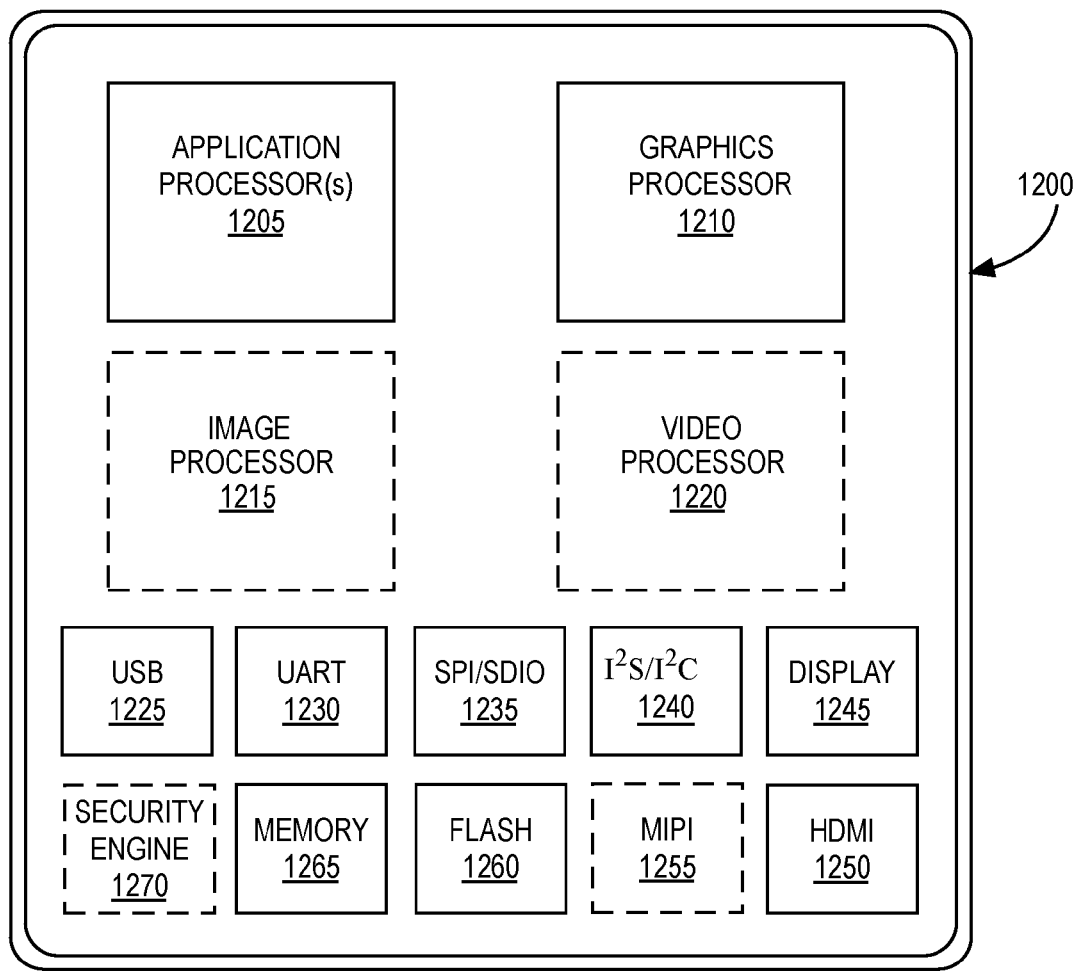
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Multi Format Lossless Compression

Described herein is a method and apparatus to perform multi-format lossless compression of a render target stream as the stream is evicted from a render cache within a graphics processor. Such compression can result in write bandwidth savings during the eviction, as well as read bandwidth savings when sampling render target data, for example, in the case of dynamic textures. Additionally, read bandwidth savings are realized when blending is used during the rendering process.

Figure 13:
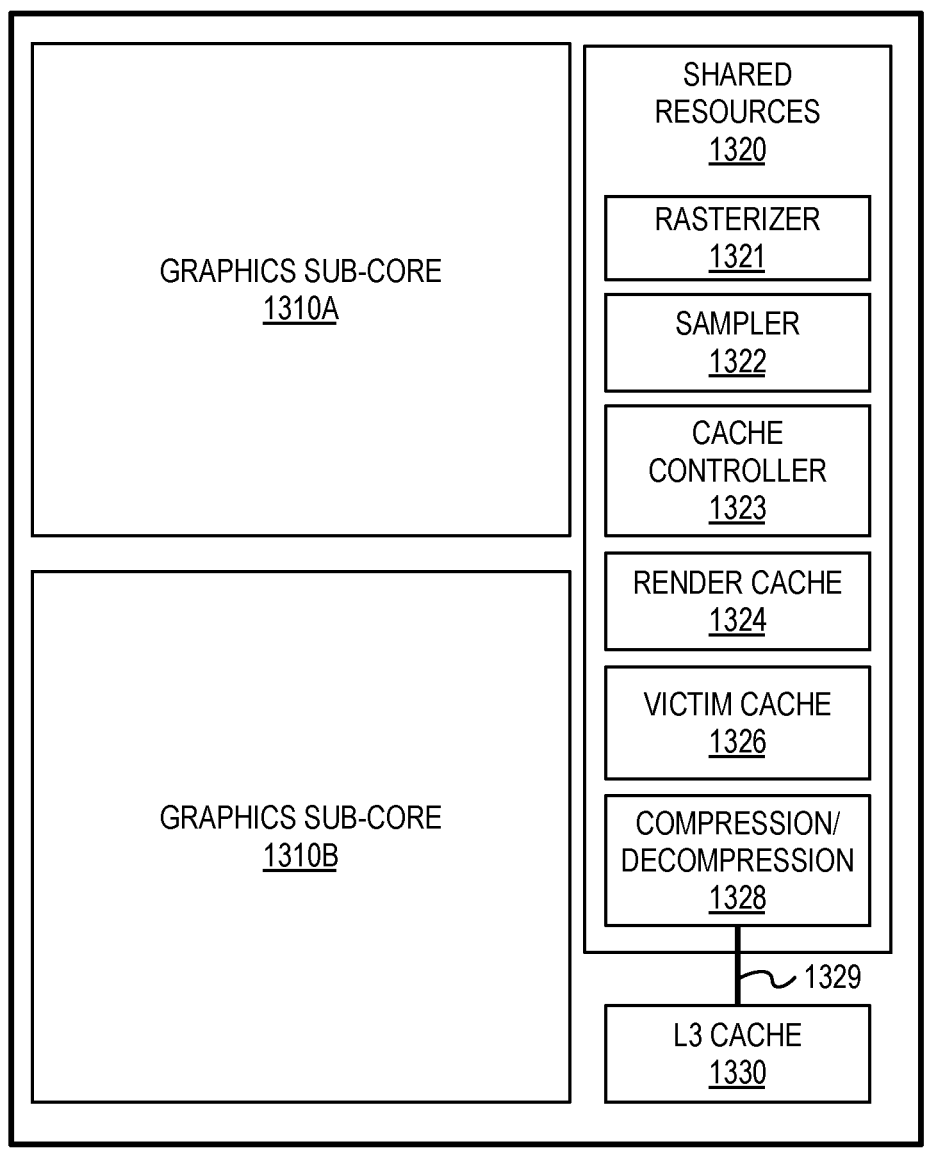
FIG. 13 is a block diagram of a graphic core with cache compression logic, according to an embodiment.

FIG. 13 is a block diagram of a graphic core with cache compression logic 1300, according to an embodiment. The graphics core with cache compression logic 1300 includes one or more multiple graphics sub-cores 1310, 1320. However, in various embodiments a single core or three or more cores are provided. Each of the graphics sub-cores 1310, 1312 includes graphics processing logic such as the graphics processing sub-core 550A and/or sub-core 560A as in FIG. 5. The graphics sub-cores 1310, 1312 share a set of shared resources 1320, which include components found, for example, in the shared resources 570A of FIG. 5. The graphics core additionally includes a level three (L3) cache 1330 which can cache memory transactions between caches within the shared resource 1320 and a last level cache or system memory. The L3 cache 1330 connects with the shared resources 1320 via a memory bus 1329.

In one embodiment the shared resources 1320 include a rasterizer 1321, a sampler 1322, a cache controller 1323, a render cache 1324, a victim cache 1326, and compression/decompression logic 1328. The rasterizer 1321 includes a windower/masker unit to perform fixed function triangle and line rasterization and in one embodiment is a variant of the rasterizer and depth test component 873 as in FIG. 8. The rasterizer 1321 analyzes data representing a geometric object to be rendered by traversing, or walking, a primitive and generating pixel data for each pixel that is part of a geometric primitive to be rendered. In one embodiment the rasterizer 1321 is a tile based rasterizer, in which pixels are rendered on the granularity of an image space grid of pixels.

The sampler 1322 provides texture sampling for 3D operations and media sampling for media operations. In one embodiment the sampler is a variant of the sampler 610 as in FIG. 6. The sampler 1322 can access render target data stored in the render cache 1324, for example, when dynamically rendered textures are in use, or when the graphics processor otherwise has an operational need to sample data from a render target.

The render cache 1324 stores render target data which is to be displayed by a display engine or used to render subsequent images for display. Data generated by the graphics sub-cores 1310, 1320 can be written to the render cache 1324, where such data may be readily accessed by other graphics processor components, such as the display engine or the sampler 1322. Memory within the render cache is divided into cache lines. While the size of the cache lines can vary among embodiments, one embodiment provides for 128-byte cache lines. In one embodiment the render cache 1324 can be configured as a multi-sample render cache and can store multiple samples of color data per-pixel.

In one embodiment the render cache 1324 is controlled by a cache controller 1323. The cache controller 1323 manages cache line allocation for data to be stored in the render cache 1324 and/or the victim cache 1326 and maintains status information for the cache lines of the render cache 1324. Components within the graphics processor core can query the cache controller 1323 to determine if data for a particular pixel or group of pixels is stored in the render cache 1324 and/or victim cache 1326 and to determine which cache lines store such data. In one embodiment the cache controller 1323 is also involved in maintaining cache coherence between the render cache 1324 and other caches in the graphics processor.

In one embodiment a victim cache 1326 couples to the render cache 1324 to store write back data that is evicted from the render cache. The victim cache 1326 can be sized relative to the render cache 1326. In one embodiment, each of the render cache 1326 an the victim cache 1326 are fully associative (e.g., m-way set associative). In one embodiment the victim cache 1326 may be a set associative cache. When data is evicted from the render cache 1324 in favor of newly stored data, instead of being written, for example, to the L3 cache 1330, the data is at least temporarily stored in the victim cache 1326. If the render cache 1324 subsequently requires the evicted data, the data can be retrieved from the victim cache 1326 instead of the higher level of the memory hierarchy to which the evicted data would have otherwise been written. For data that is evicted from the render cache and/or the victim cache, a compression operation is performed by the compression/decompression logic 1328 to compress the evicted data before the data is written to the L3 cache 1330 and/or system memory via the memory bus 1329.

In one embodiment the render cache 1324 includes cache lines having a width that a multiple of the width of the memory bus 1329. In such embodiment the compression logic is configured with a compression ratio target to enable greater write and read efficiency over the memory bus 1329 by compressing the render target cache line, such that the compressed data is equal to or an otherwise lower valued multiple of the width of the memory bus 1329. For example and in one embodiment, the L3 cache 1330 includes 64-byte cache lines, the memory bus 1329 has a width of 64 bytes, and the render cache 1324 has cache lines of 128 bytes. In such embodiment, an 128-byte victim cache is coupled to the render cache 1324 and the compression/decompression logic 1328 is configured with a compression ratio target of 2:1. In one embodiment, data that cannot be reduced in size by at least a 50% is evicted uncompressed. Hardware within the compression/decompression logic 1328 can evaluate and compress or bypass data during eviction without introducing significant delay into the memory cycle of the graphics processor.

Figure 14:
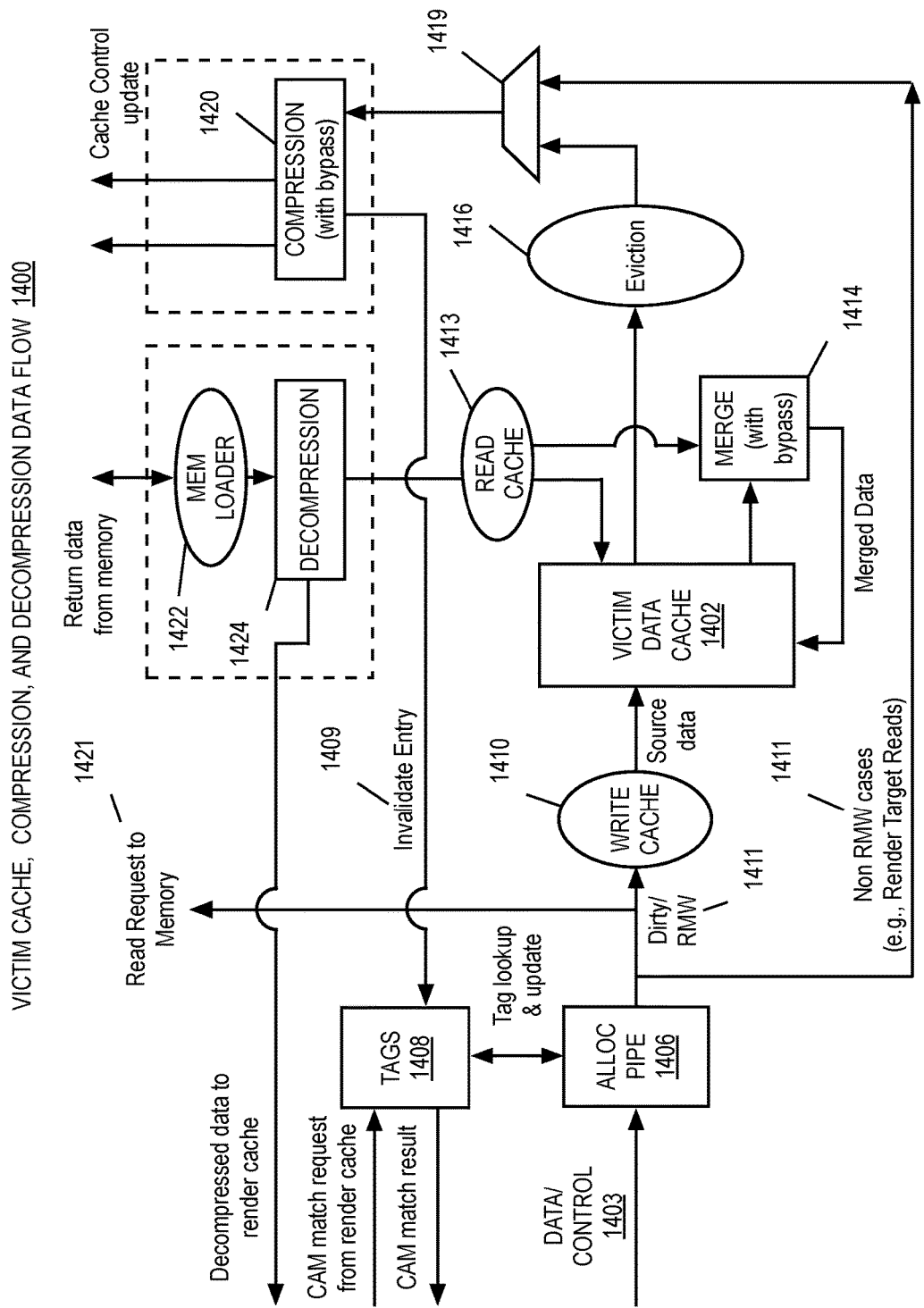
FIG. 14 illustrates victim cache, compression, and decompression data flow, according to an embodiment.

FIG. 14 illustrates victim cache, compression, and decompression data flow 1400, according to an embodiment. In on embodiment, a victim data cache 1402 is positioned in the eviction data path of the render cache to cache modified (e.g., dirty) cache lines that are evicted from the render cache during cache write back operations. Data and control signals 1403 from the render cache are coupled to a victim cache allocation pipeline 1406, which performs cache line allocations in the victim data cache 1402 for data evicted from the render cache. In one embodiment, higher order bits of an address associated with the evicted data is stored in the victim cache tags 1408 when the evicted data is written to the victim data cache 1402. The victim cache tags 1408 also can include data indicating whether a cache line is valid or invalid, and cache coherency logic can invalidate 1409 cache entries that store data that has been updated elsewhere in the graphics processor. The tags 1408 can be searched via a content addressable memory to determine whether requested data is stored in the victim data cache 1402.

Evicted modified (e.g. dirty) 1411 data can be written to the victim data cache 1402 via a write cache buffer 1410. Data can be read from the victim data cache 1402 via a read cache buffer 1413. The victim data cache 1402 includes merge logic 1414 with a bypass function and includes support for atomic read-modify-write operations. Write back data evicted from the render cache can be cached within the victim data cache 1402 and subsequently retrieved if needed by a successive rendering operation. During eviction from the victim data cache 1402, data can be written to an eviction buffer 1416 from which the data is compressed via compression logic 1420 before being written to a higher level of the memory hierarchy, for example, an L3 cache 1330 as in FIG. 13. In one embodiment the compression logic 1420 can compress data evicted from the victim data cache 1402 before the data is written out via a memory bus if the data can be compressed to the target compression ratio. In such embodiment, if the target compression ratio can not be met, the compression is bypassed and the data is written in an uncompressed format. Cache control metadata is updated for the evicted block of data to indicate if the data is compressed or uncompressed.

In response to a read request from memory 1421, data is read by a memory loader 1422 and, if the data is stored in a compressed format, the data is decompressed by decompression logic 1424 before being provided to the render cache or merged with data in the victim data cache 1402.

In addition to compression of modified (e.g., dirty 1411) data evicted via the victim data cache 1402, render target reads of unmodified data via a pixel shader or fragment shader program can also take advantage of the compression logic 1420. In one embodiment, a multiplexer 1419 coupled to the eviction data path of the victim data cache 1402 enables the compression of render target reads via the compression logic 1420 before the data is written via the memory bus, such that data read from the render cache may be compressed without being cached via the victim cache.

Figure 15:
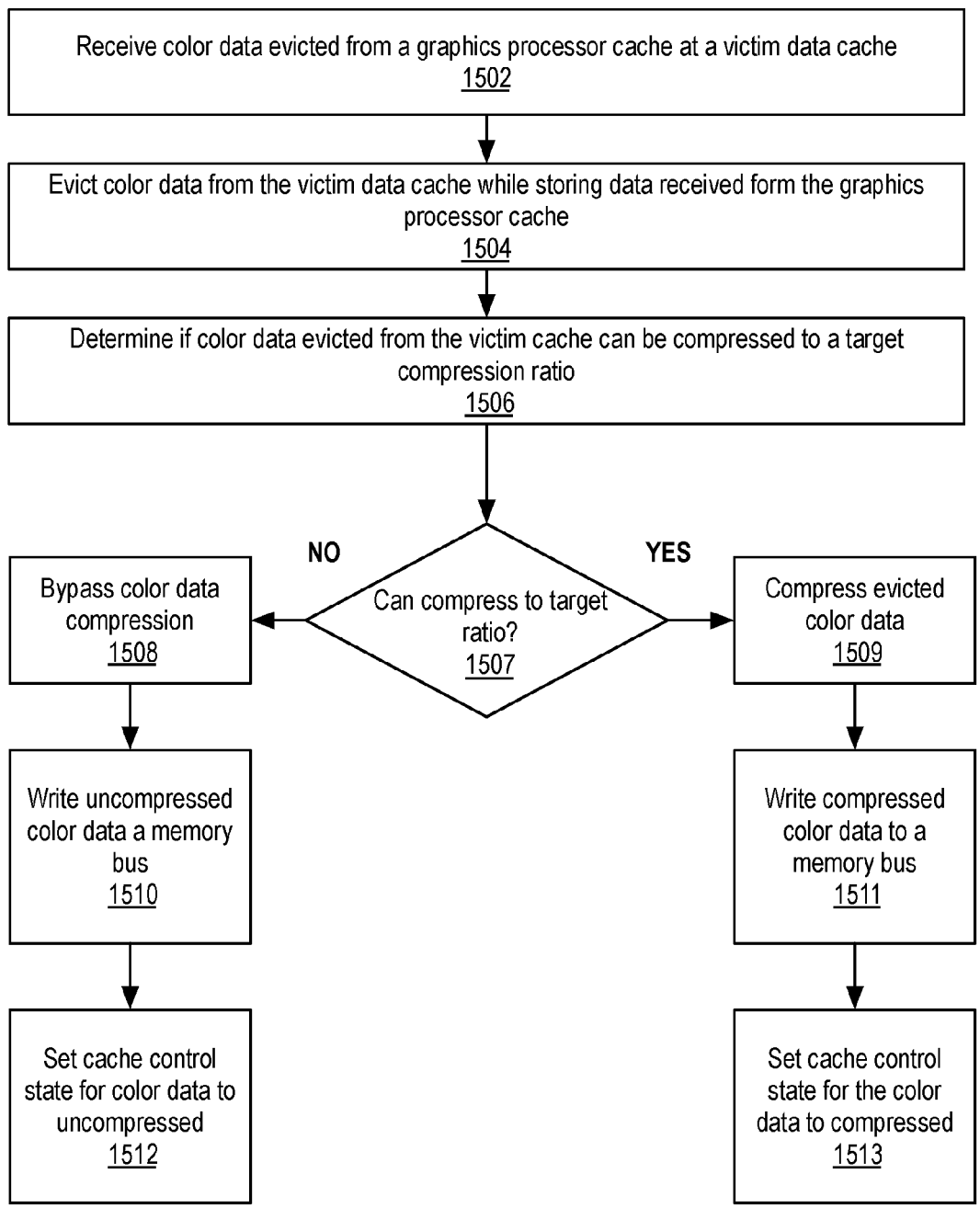
FIG. 15 is a flow diagram of cache color data compression logic, according to an embodiment.

FIG. 15 is a flow diagram of cache color data compression logic 1500, according to an embodiment. The cache color data compression logic 1500 can be applied generally to color data caches within a graphic processor, such as the render cache of FIG. 13, using logic components illustrated in FIG. 14. In one embodiment the logic performs operations to receive color data evicted form a graphics processor cache at a victim data cache, as shown at block 1502. The logic can evict color data from the victim data cache in response to receiving data from the graphics processor cache or can evict the color data while storing the received data, as shown at block 1504. The logic can determine if the color data evicted from the victim cache can be compressed to a target compression ratio at block 1506. While data evicted from the victim data cache at block 1504 is evaluated for compressibility by compression logic at 1506, data that is read from the render cache, for example, during a render target read operations, may also be evaluated for compression by the compression logic at block 1506.

If at 1507 the cache color data compression logic 1500 can compress the color data to a target compression ratio, the logic can compress the evicted color data at block 1509. At block 1511 the logic can write the compressed color data to the memory bus. Data is written to the memory bus in response to a read request by a graphics processor component and can result in the data being cached in higher levels of the memory hierarchy, such as an L2, L3, L4, or other level of graphics processor cache, or written graphics processor memory or system memory. At block 1513, the logic can set a control state, such as a cache control state or other metadata for the compressed color data to indicate to consumers of the compressed color data that that the data may require decompression after being read.

If it is determined at 1507 that the color data cannot be compressed to the target compression ratio, the logic can bypass color data compression at block 1508 and write the uncompressed (e.g., raw) color data to the memory bus at block 1510. The logic can then set the cache control state for the color data to uncompressed at block 1512, to indicate to consumers of the color data that decompression is not required to read the data.

Logic to perform compression and decompression of color data is exemplified by the pseudo code logic provided in the tables below and in FIGS. 16-17.

Table 1 shows an exemplary data structure for a point cluster model of the lossless compression algorithm used for evicted color data.

TABLE 1

Point Cluster Model data structure

```
// Base color point of the Point cluster Model: P0 (r_min, g_min, b_min,
a_min);
// Skip Bit in each color channel: (skipR, skipG, skipB, skipA);
// Maximal Delta Bits in each color channel: (dR, dG, dB, dA);
// Residual bits packed in residual envelope:
    R_word: dr[0] + (dr[1] +(dr[2]+... (dr[N-1]<< dR)...<<dR)<< dR;
    G_word: dg[0]+ (dg[1]+(dg[2]+...(dg[N-1]<<dG)...<<dG)<< dG;
    B_word: db[0]+ (db[1]+(db[2]+... (db[N-1]<<dB)...<<dB)<< dB;
    A_word: da[0]+ (da[1]+(da [2]+...(da[N-1]<<dA)...<<dA)<< dA;
```

A point cluster model is used to encode color data into a compressed format. In one embodiment delta compression is used in which a base color is determined for a color format and a number of skip bits, delta bits and residual bit values are determined. These parameters are used encode the color data into a reduced size format without discarding any of the color data. The encoded format can be loslessly decoded into the original data format.

Given an original bits per pixel format of raw_bpp (e.g., uncompressed) Tables 2-6 show exemplary pseudo code logic to encode and decode a tile of a color render target. In the exemplary logic, the total number of pixels is represented by N and the original format is an eight bits per pixel RGBA format, such as R8G8B8A8. However, other color formats may be used.

Table 2 shows exemplary pseudo code logic to define a base color with all points in the RGBA space.

TABLE 2

Compressed Format Encoding Logic

```
// Define a base color with all the color points in the R-G-B-A space:
// if RT format has fewer channels than ARGB, this can be still applied
minR=mixG=minB=minA=MAX_PER_FORMAT ;
// MAX_PER_8BPC = 255 likewise
For (i=0; i<N-1;i++)
    {
    If (minR>R[i]) minR = R[i];
    If (minG>G[i]) minG = G[i];
    If (minB>B[i]) minB = B[i];
    If (minA>A[i]) minA = A[i];
    }
Base_Color = (minR, minG, minB, minA);
```

Table 3 shows exemplary prediction and residual logic.

TABLE 3

Prediction and Residual Logic

```
// Prediction & Residual:
// Approximate each color point with the base color from the point model;
// Calculate the residual and maximal delta bits used for residual coding:
maxR_res = maxG_res = maxB_res = maxA_res = 0 ;
For (i=0; i<N-1;i++) {
    Color_res[i] = Color[i] - Base_Color;
    If (maxR_res<Color_res[i].R)
        maxR_res = Color_res[i].R;
    If (maxG_res<Color_res[i].G)
        maxG_res = Color_res[i].G;
    If (maxB_res<Color_res[i].B)
        maxB_res = Color_res[i].B;
    If (maxA_res<Color_res[i].A)
        maxA_res = Color_res[i].A;
}
dR = total_num_of_bits (maxR_res);
dG = total_num_of_bits (maxG_res);
dB = total_num_of_bits (maxB_res);
dA = total_num_of_bits (maxA_res);
```

Table 4 shows exemplary logic to determine a compression mode for the compressed data. The compression mode options in the exemplary logic of Table 4 are compressed or raw. In one embodiment, if the target compression ratio for a tile of data is not met, the tile is not compressed and evicted in a raw (e.g., uncompressed state). The exemplary render target cache line size for the logic is 128 bytes with a target compressed size of at least 64 bytes. However, size sizes are exemplary of one embodiment and other embodiments are not so limited.

TABLE 4

Compression Mode Determination Logic

```
// Count the residual bits from all pixels at each color channel
// Bits are packed ordered as LSB to MSB from first pixel to the last pixel
of the tile
    R_word: dr[0] | (dr[1] | (dr[2] |... (dr[N-1]<< dR)...<<dR)<< dR;
    G_word: dg[0] | (dg[1] | (dg[2] |...(dg[N-1]<<dG)...<<dG)<< dG;
    B_word: db[0] | (db[1] | (db[2] |... (db[N-1]<<dB)...<<dB)<< dB;
    A_word: da[0] | (da[1] | (da [2]| ...(da[N-1]<<dA)...<<dA)<< dA;
//  Special case: if any of max_res is 0, the skip_bit of that channel is
    1,
//  entire word of that channel is skipped;
//  Otherwise, the skip_bit of any channel with non empty residual is 0.
//  Count the total number of bits and determine the compression mode:
num_of_bits = raw_bpp;    // Base Color
num_of_bits += skipR +    // Skip bits in all channels
        skipG +
        skipB +
        skipA ;
num_of_bits += maxR_res + // Delta_bits in all channels
        maxG_res +
        maxB_res +
        maxA_res;
num_of_bits += total_num_of_bits(R_word) + // Residuals from
all channels
        total_num_of_bits(G_word) +
        total_num_of_bits(B_word) +
        total_num_of_bits(A_word);
if (num_of_bits < 1/2 * raw_bpp*N) // 2:1 compression is achieved
    CCS_MODE = TILE_COMP;
else
    CCS_MODE = TILE_RAW;
```

The resulting output from the logic of table 4 determines if an exemplary target compression ratio of 2:1 has been achieved. If so, the data is marked as compressed. Otherwise, the data is marked as raw, indicating that the data is uncompressed. If the data, in this case, a tile of pixel data, can be compressed, the data is packed as shown in Table 5.

TABLE 5

Compressed Data Packing logic

```
// If the tile can be compressed (such as 128Bytes -> 64 Bytes), pack bits:
    PackTile ( Base_Color, Surface_Format,
        dR, dG, dB, dA,
        skipR, skipG, skipB, skipA,
        R_word, G_word, B_word, A_word);
```

Figure 16:
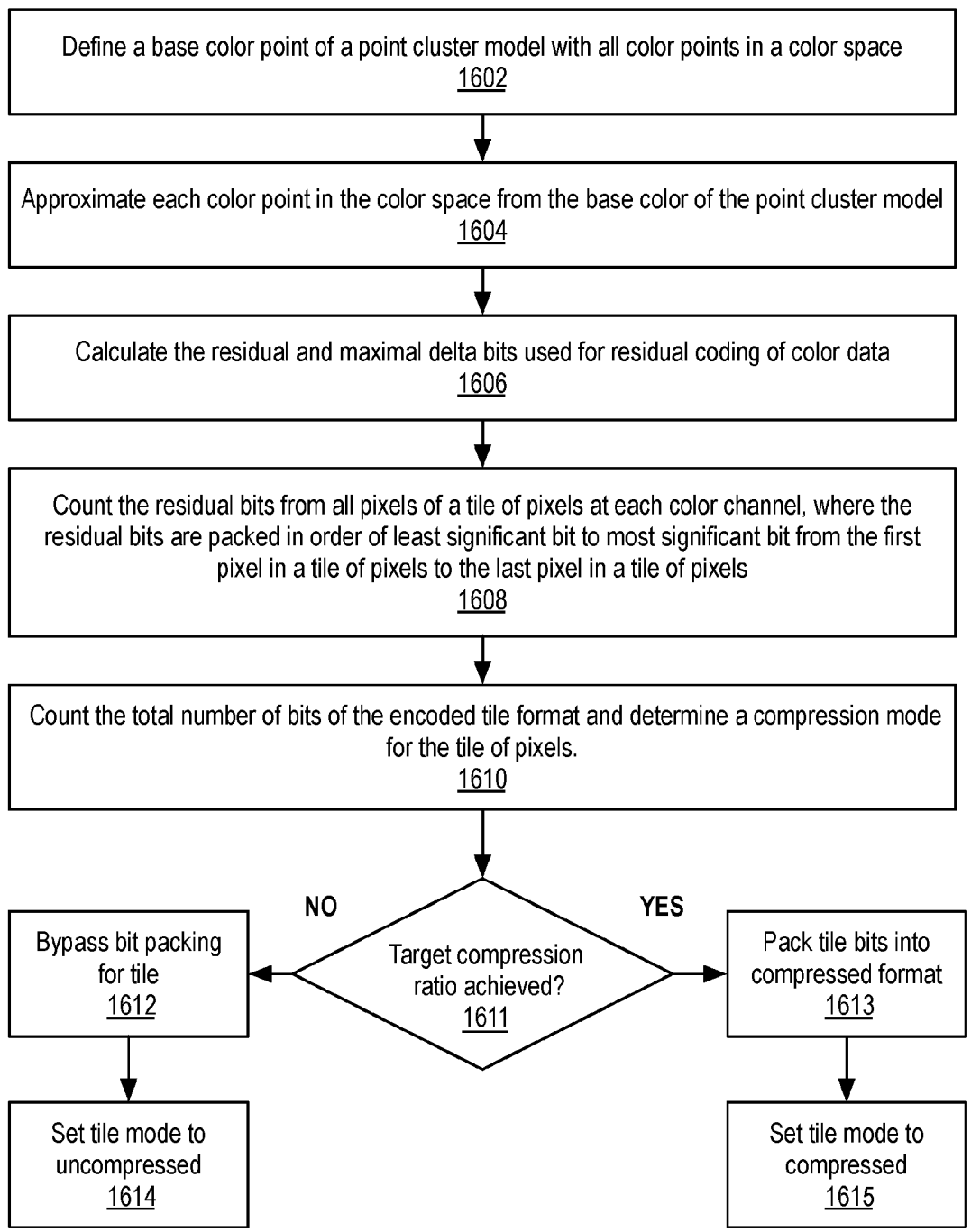
FIG. 16 is a flow diagram of color data compression logic to compress color data during victim cache eviction, according to an embodiment.

FIG. 16 is a flow diagram of color data compression logic 1600 to compress color data during victim cache eviction, according to an embodiment. The color data compression logic 1600 can be performed by the compression logic 1420 as in FIG. 14. The color data compression logic 1600, in one embodiment, operates on color data on a per-tile basis, where a tile includes a color data for a grid of multiple pixels. Additional detail on the compression logic is shown in Tables 1-5 above.

Operations performed by the color data compression logic 1600 includes to define a base color of a point cluster model, where the base color has all points in a color space, as shown at block 1602. At block 1604, the logic can approximate each color point in the color space from the base color of the point cluster model. The logic can then calculate the residual and maximal delta bits to use for residual coding of the color data at block 1606.

At block 1608, the logic can count the residual bits from all pixels of a tile of pixels at each color channel of the pixels. The residual bits are packed in order of least significant bit to most significant bit from the first pixel in a tile of pixels to the last pixel in a tile of pixels. At block 1610, the logic can count the total number of bits for a compressed tile format and determine the compression mode for the tile. The total number of bits includes the number of bits for the base color, plus the skip bits, delta bits, residuals for each color channel.

In one embodiment, the compression mode for the tile is determined based on whether the compressed representation for the tile data meets a target compression ratio, as determined at 1611. If the target compression ratio is met, the logic packs the tile bits into a compressed format at block 1613. The logic can then sets the tile mode in tile metadata to compressed at block 1615. If the target compression ratio is not achieved, the logic can bypass bit packing for the tile at block 1612 and set the tile mode in the tile metadata to uncompressed at block 1614.

Figure 17:
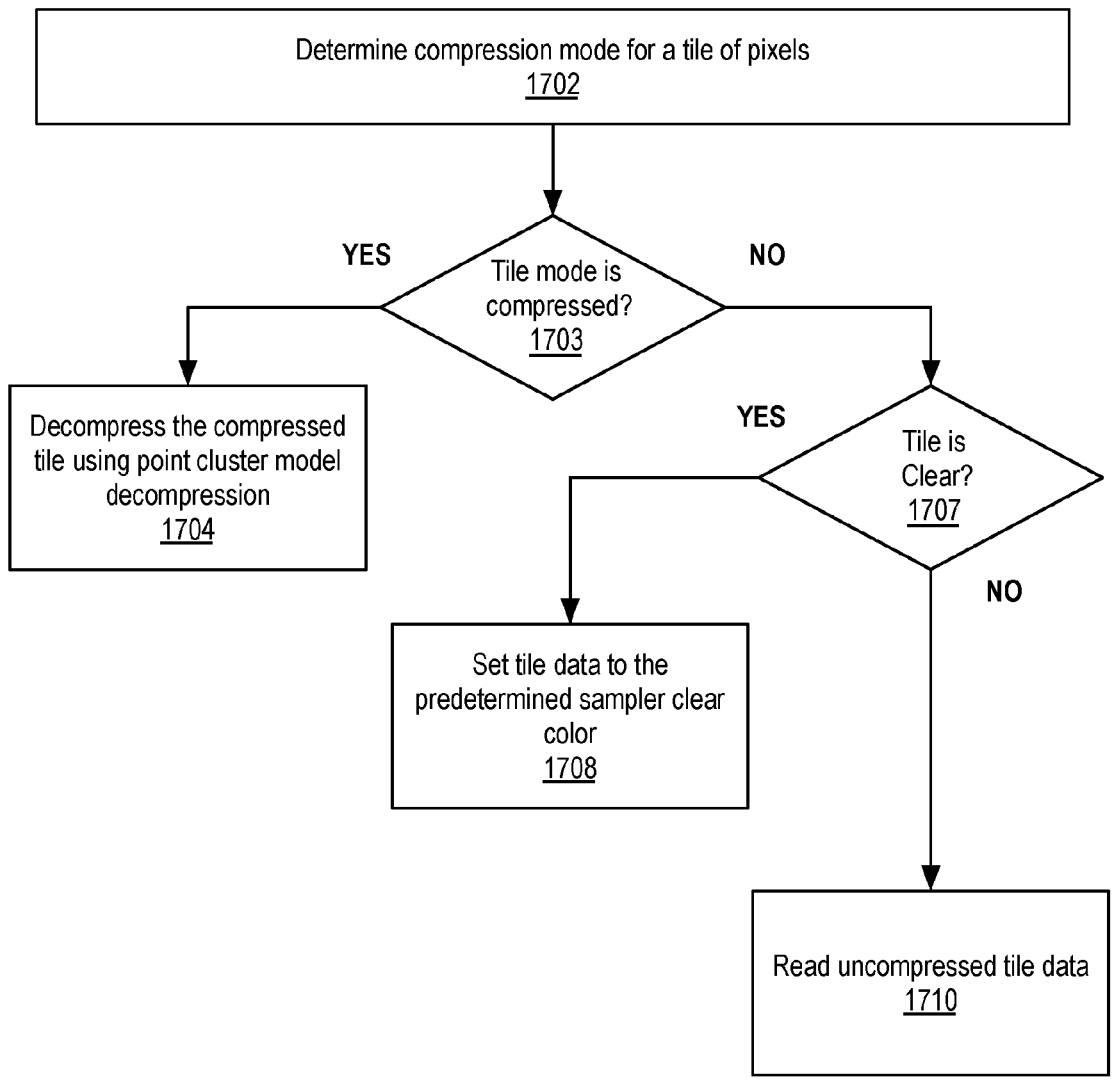
FIG. 17 is a flow diagram of color data decompression logic to decompress compressed color data when consuming compressed color data, according to an embodiment.

Exemplary pseudo code logic to perform decoding of compressed data is shown in Table 6 and FIG. 17.

TABLE 6

Compressed Data Decoding

```
// The pseudo code to decode a tile of color RT based on CCS_MODE.
    (1) Select from 3 different Title modes at top level:
        Switch: (CCS_MODE)
        Case: RCC_CL_CLEAR:
            rawRCC_CL = ReconRCC_CL (Sampler_State.Clear_Color);
            break;
        Case: RCC_CL_COMP:
            compTile = Mem_Read_Byte (RT_Addr, 64);
            rawTile = Decompress_PointClusterModel_RCC_CL (compTile);
        break;
        Case: RCC_CL_RAW:
            rawRCC_CL = Mem_Read_Byte (RT_Addr, 128);
            break;
// Unpack: Unpack the base color, the delta bits and residual bits in each
        channel for all pixels within RCC_CL:
Function Decompress_PointClusterModel_RCC_CL (compRCC_CL)
{
    Get_BaseColor (compRCC_CL, &Base_Color);
    Get_Delta_Bits (compRCC_CL, &dR, &dG, &dB, &dA);
    Get_SkipBit (compTile, Surface_Format, &skipR, &skipG, & skipB, &skipA);
    Get_Res (compRCC_CL, &R_word, &G_word, & B_word, &A_word);
    If (skipR)
        dr[0] = dr[1] = ... = dr[N-1] = 0;
    else
        {
        dr[0] = Get_LSB(R_word, dR); R_word = R_word>>dR;
        dr[1] = Get_LSB(R_word, dR); R_word = R_word>>dR;
        ......
        dr[N-1] = Get_LSB(R_word, dR);
        }
    If (skipG)
        dg[0] = dg[1] = ... = dg[N-1] = 0;
    else
        {
        dg[0] = Get_LSB(G_word, dG); G_word = G_word>>dG;
        dg[1] = Get_LSB(G_word, dG); G_word = G_word>>dG;
        ......
        dg[N-1] = Get_LSB(G_word, dG);
        }
    If (skipG)
        db[0] = db[1] = ... = db[N-1] = 0;
    else
        {
        db[0] = Get_LSB(B_word, dB); B_word = B_word>>dB;
        db[1] = Get_LSB(B_word, dB); B_word = B_word>>dB;
        ......
        db[N-1] = Get_LSB(B_word, dB);
        }
    If (skipA)
        dA[0] = dA[1] = ... = dA[N-1] = 0;
    else
        {
        dA[0] = Get_LSB(A_word, dA); A_word = A_word>>dA;
        dA[1] = Get_LSB(A_word, dA); A_word = A_word>>dA;
        ......
        dA[N-1] = Get_LSB(A_word, dA);
        }
    ......
```

TABLE 6-continued

Compressed Data Decoding

```
    rawTile = 0;
    For (i=0; i<N-1;i++)
    {
        Color[i] = Base_Color + Color (dr[i], dg[i], db[i], da[i]);
        UnPack(rawRCC_CL, i, Color[i]);
    }
}
```

The logic of Table 6 first determines the format in which the data is stored, which indicates whether the data is a compressed tile of data that is to be decoded. Alternatively, the data may be raw or uncompressed data that does not require decoding or the data can be data that indicates sampler state clear data, which is used to implement a fast render target clear operation in which, instead of performing a clear operation on render target data, metadata for the render target is flagged as cleared, and the sampler substitutes the defined clear color for the tile instead of reading the actual tile data. In incorporated tile compression for evicted render target data into an existing fast clear implementation, additional metadata bits may be added to the cache metadata for evicted pixels to support an indication that the tile if pixels is in a compressed state.

FIG. 17 is a flow diagram of color data decompression logic 1700 to decompress compressed color data when consuming compressed color data, according to an embodiment. The color data decompression logic 1700 can be performed by the decompression logic 1424 as in FIG. 14, or by any graphics processor component that can consume compressed tile data, such as a sampler 1322 as in FIG. 13, or a display engine 840 as in FIG. 8. For example, a compressed cache line of render target data can be compressed from 128 bytes, transmitted over a 64 bytes per cycle memory bus and stored in a compressed format in a 64-byte L3 cache. Components consuming the compressed data can then read a 64-byte L3 cache line and decompress the data into 128 bytes of memory.

As shown at block 1702, the color data decompression logic 1700 can determine a compression mode for a tile of pixels stored in memory, such as graphics processor memory, system memory or graphics processor cache memory. If the tile mode is compressed, as shown at 1703, the logic can decompress the compressed tile using point cluster model decompression at block 1704, as further described in Table 6 above.

If the tile mode is not compressed at 1703, in one embodiment the tile is either a clear tile or an uncompressed tile. If the tile is clear, as determined at 1707, the logic can set the tile data to the predetermined sampler clear color, as shown at block 1708. The sample clear color can be predetermined by fast clear logic within the graphics processor. If the tile is not clear at 1707, then the color data decompression logic 1700 can read the uncompressed tile data from memory at block 1710.

Figure 18:
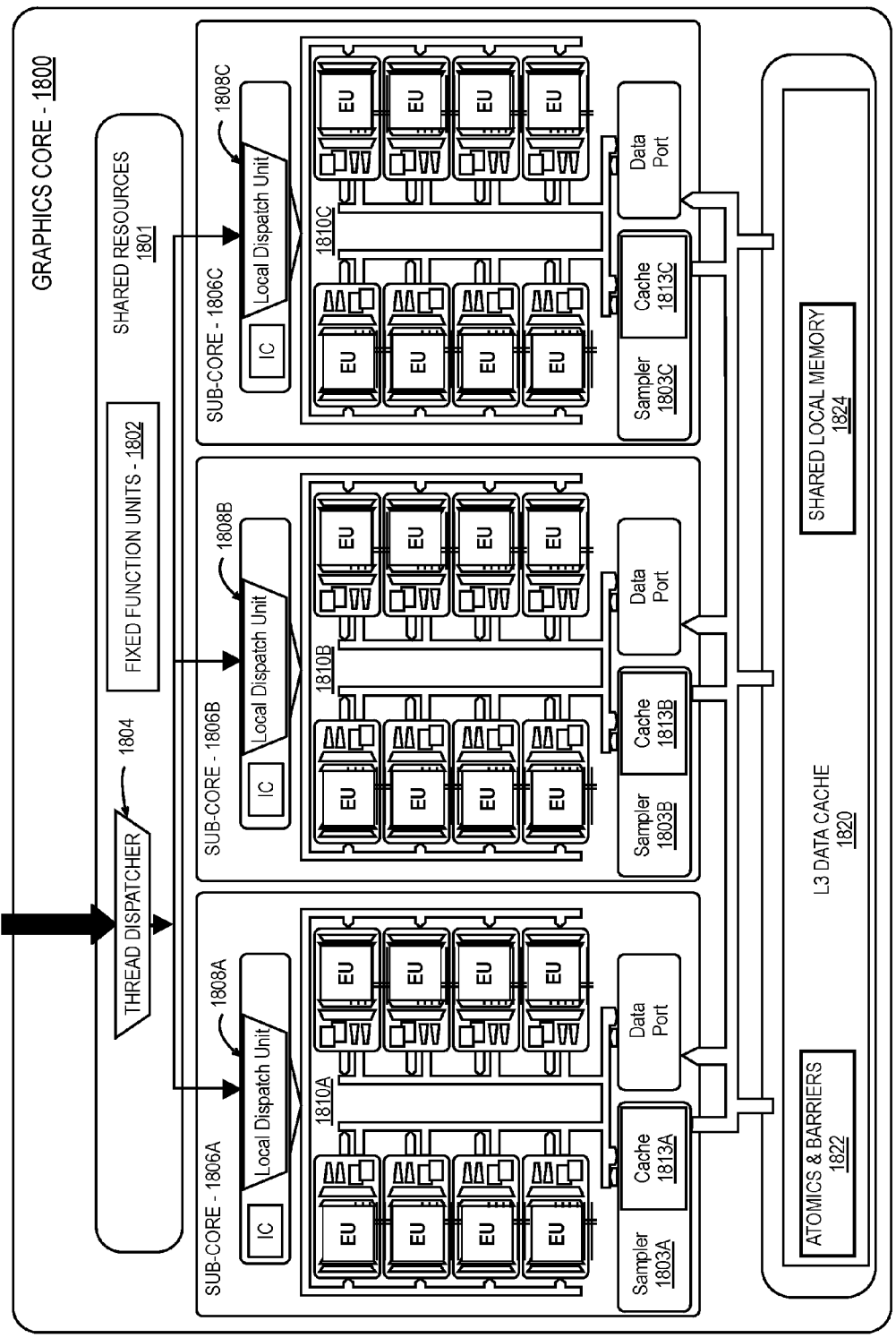
FIG. 18 is a detailed block diagram of graphic core logic, according to an embodiment.

FIG. 18 is a detailed block diagram of graphic core logic, according to an embodiment. In one embodiment the graphics core 1800 (e.g., slice) includes a cluster of sub-cores 1806A-1806C, which may be variants of the sub-cores 550A-550N. In one embodiment the graphics core includes shared resources 1801, such as the shared resources 1320 of FIG. 13. However, in the illustrated embodiment each of the sub-cores 1806A-1806C includes sampler resources 1803A-1803C and a sampler cache 1813A-1813C. In one embodiment the shared resources 1801 include of a set of fixed function units 1802, for example, to support media, two-dimensional graphics functionality, and pixel back end operations. For programmable graphics and computational processing, a thread dispatcher 1804 can dispatch execution threads to the various sub-cores 1806A-1806C, where a local dispatch unit 1808A-1808C dispatches execution threads to the execution unit groups 1810A-1810C in each of the sub-cores. The number of execution units in each of the execution unit groups 1810A-1810C can vary among embodiments. Execution units within each group 1810A-C can also be dynamically enabled or disabled based on workload, power, or thermal conditions.

In one embodiment, a level-3 (L3) data cache 1820 is shared between each of the sub-cores 1806A-C. The L3 data cache, in one embodiment, is a variant of the L3 cache 1330 of FIG. 13. The L3 data cache 1820 can include an atomics & barriers unit 1822 and shared local memory 1824. The atomics & barriers unit 1822 includes dedicated logic to support implementation of barriers across groups of threads and is available as a hardware alternative to pure compiler or software based barrier implementations. Additionally, the atomics & barriers unit 1822 enables a suite of atomic read-modify-write memory operations to the L3 data cache 1820 or to the shared local memory 1824. Atomic operations to global memory can be supported via the L3 data cache 1820.

In one embodiment, the shared local memory 1824 supports programmer managed data for sharing amongst hardware threads, with access latency similar to the access latency to the L3 data cache 1820. In one embodiment, the shared local memory 1824 sharing is limited to between threads within the same sub-core 1806A-C, however, not all embodiments share such limitation.

Figure 19:
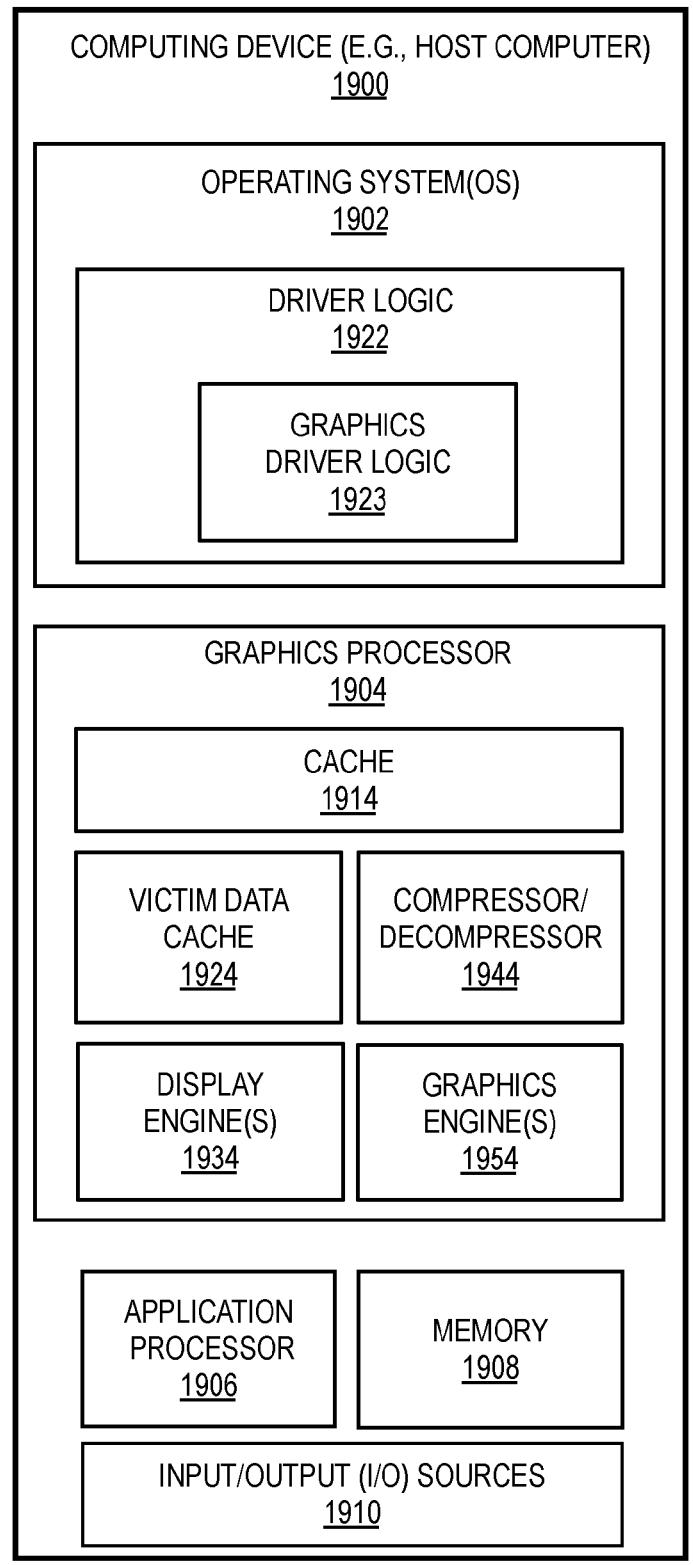
FIG. 19 is a block diagram of a computing device including a graphics processor, according to an embodiment.

FIG. 19 is a block diagram of a computing device 1900 including a graphics processor 1904, according to an embodiment. The computing device 1900 can be a computing device such as the data processing system 100 as in of FIG. 1. The computing device 1900 may also be or be included within a communication device such as a set-top box (e.g., Internet-based cable television set-top boxes, etc.), global positioning system (GPS)-based devices, etc. The computing device 1900 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1900 includes a mobile computing device employing an integrated circuit ("IC"), such as system on a chip ("SoC" or "SOC"), integrating various hardware and/or software components of computing device 1900 on a single chip.

The computing device 1900 includes a graphics processor 1904, which may be any graphics processor described herein. The graphics processor 1904 includes cache memory 1914, a victim data cache 1924 and compressor/decompressor logic 1944 as described herein. The cache memory 1914 may be a render cache, a sampler cache, a depth cache, or any other graphics processor cache memory described herein. The graphics processor also includes one or more graphics engine(s) 1954, which may include one or more instances of the graphics core 1800 of FIG. 18, or any graphics execution logic described herein, such as the execution logic 600 of FIG. 6. The graphics processor 1904 also includes a set of registers, including control registers to configure and control operations for the graphics processor 1904. The graphics processor 1904 also includes a display engine 1934 to couple the graphics processor to a display device. The display engine 1934, in one embodiment, includes decompressor logic as in the compressor/decompressor logic 1944 to enable consumption of compressed data evicted form the victim data cache 1924.

Data that is processed by the graphics processor 1904 is stored in a buffer within a hardware graphics pipeline and state information is stored in memory 1908. The resulting image is then transferred to a display controller of the display engine 1934 for output via a display device, such as the display device 319 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

As illustrated, in one embodiment, in addition to a graphics processor 1904, the computing device 1900 may further include any number and type of hardware components and/or software components, such as (but not limited to) an application processor 1906, memory 1908, and input/output (I/O) sources 1910. The application processor 1906 can interact with a hardware graphics pipeline, as illustrated with reference to FIG. 3, to share graphics pipeline functionality. The application processor 1906 can include one or processors, such as processor(s) 102 of FIG. 1, and may be the central processing unit (CPU) that is used at least in part to execute an operating system (OS) 1902 for the computing device 1900. The OS 1902 can serve as an interface between hardware and/or physical resources of the computer device 1900 and a user. The OS 1902 can include driver logic 1922 for various hardware devices in the computing device 1900. The driver logic 1922 can include graphics driver logic 1923 such as the user mode graphics driver 1026 and/or kernel mode graphics driver 1029 of FIG. 10.

It is contemplated that in some embodiments, the graphics processor 1904 may exist as part of the application processor 1906 (such as part of a physical CPU package) in which case, at least a portion of the memory 1908 may be shared by the application processor 1906 and graphics processor 1904, although at least a portion of the memory 1908 may be exclusive to the graphics processor 1904, or the graphics processor 1904 may have a separate store of memory. The memory 1908 may comprise a pre-allocated region of a buffer (e.g., framebuffer); however, it should be understood by one of ordinary skill in the art that the embodiments are not so limited, and that any memory accessible to the lower graphics pipeline may be used. The memory 1908 may include various forms of random access memory (RAM) (e.g., SDRAM, SRAM, etc.) comprising an application that makes use of the graphics processor 1904 to render a desktop or 3D graphics scene. A memory controller hub, such as memory controller hub 116 of FIG. 1, may access data in the memory 1908 and forward it to graphics processor 1904 for graphics pipeline processing. The memory 1908 may be made available to other components within the computing device 1900. For example, any data (e.g., input graphics data) received from various I/O sources 1910 of the computing device 1900 can be temporarily queued into memory 1908 prior to their being operated upon by one or more processor(s) (e.g., application processor 1906) in the implementation of a software program or application. Similarly, data that a software program determines should be sent from the computing device 1900 to an outside entity through one of the computing system interfaces, or stored into an internal storage element, is often temporarily queued in memory 1908 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 1910 may include one or more I/O devices that are implemented for transferring data to and/or from the computing device 1900 (e.g., a networking adapter); or, for a large-scale non-volatile storage within the computing device 1900 (e.g., hard disk drive). User input devices, including alphanumeric and other keys, may be used to communicate information and command selections to graphics processor 1904. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 1900 may be employed to observe gestures, record audio and video and to receive and transmit visual and audio commands.

I/O sources 1910 configured as network interface(s) can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 1900 may vary from implementation to implementation depending upon numerous factors, such as price constraints, performance requirements, technological improvements, or other circumstances. Examples include (without limitation) a mobile device, a personal digital assistant, a mobile computing device, a smart-phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In general, embodiments provide for an apparatus to perform multi-format lossless compression of a render target stream as the stream is evicted from a render cache within a graphics processor. Such compression can result in write bandwidth savings during the eviction, as well as read bandwidth savings when sampling render target data, for example, in the case of dynamic textures. Additionally, read bandwidth savings are realized when blending is used during the rendering process.

One embodiment provides for a graphics processing apparatus including a cache memory and logic coupled to the cache memory to compress color data output from the first cache memory. In one embodiment the cache memory is a render cache. In one embodiment the cache memory is a victim data cache. In one embodiment the cache memory is a render cache coupled to a victim data cache and logic is configured to compress color data evicted from the render cache and the victim data cache. The compression can include a target compression ratio to which the data is to be compressed. In one embodiment compressed color data output from the cache memory may be written to a memory bus. The target compression ratio can be a ratio between the size of a cache line of the cache and the data width of the memory bus. The target compression ratio can also be a ratio between the cache memory and another cache memory in the apparatus, such as a level three cache. In one embodiment one or more compression steps are bypassed if it is determined that the data cannot be compressed, or losslessly compressed to the target compression ratio. For example and in one embodiment the graphic processing apparatus can bypass packing compressed bits of color data when the color data is determined to be incompressible or losslessly incompressible to the target compression ratio.

In one embodiment the cache memory is a render cache coupled to a victim data cache and the logic to compress color data is coupled to the render cache and the victim data cache. The victim data cache can be configured to evict second color data in connection with receipt of first color data and the logic can compress the second color data. In one embodiment the color data compression is lossless delta compression.

One embodiment provides or a method of managing a graphics processor cache. The method includes receiving first color data evicted from a graphics processor cache at a victim data cache; evicting second color data from the victim data cache; determining if the second color data is compressible to a target compression ratio; compressing the second color data in response to the determining; and writing compressed second color data to a memory bus. In one embodiment the method additionally includes setting a control state for the second color data indicating a compressed state. The method can also comprise bypassing compressing the second color data in response to determining the second color data is incompressible to the target compression ratio and writing uncompressed second color data to the memory bus. In conjunction with writing uncompressed second color data to the memory bus, the method also includes setting a control state for the second color data indicating an uncompressed state.

A further embodiment provides for a system comprising a first processor including one or more processor cores; a graphics processor coupled to the first processor on a same die, the graphics processor including a first cache memory and logic to compress color data evicted from the first cache memory; a display controller coupled to the first cache memory via a bus, the display controller to read compressed color data from the first cache memory; and a display device to display output from the display controller. In one embodiment, the first cache memory is a render cache coupled to a victim data cache and the logic is configured to compress color data evicted from the render cache and the victim data cache. In a further embodiment the logic configured to losslessly compress color data evicted from the render cache and the victim data cache. In one embodiment the logic is configured to determine whether the color data to be compressed is compressible to a target compression ratio. The logic can bypass packing of the compressed bits of the color data when the color data is determined to be incompressible to the target compression ratio and write the data to a memory bus in an uncompressed format. One embodiment provides for control logic to track whether data is written in a compressed or uncompressed format.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
a render cache memory to store render target data which is to be displayed by a display engine or used to render subsequent images for display;

a victim cache memory communicatively coupled to the render cache memory to store writeback color data that is evicted from the render cache memory;

a memory bus coupled to the render cache memory and the victim cache memory;

a higher level cache memory coupled to the memory bus; and logic coupled to the render cache memory, the victim cache memory, and to the memory bus to compress the writeback color data evicted from the render cache memory to the victim cache memory selectively in response to a determination that the writeback color data can be compressed to a threshold compression level to generate compressed writeback color data for storage in the higher level cache memory.

2. The graphics processing apparatus as in claim 1, wherein the compressed color data output from the render cache memory is to be retrieved from the higher level cache memory through the memory bus for a successive render operation.

3. The graphics processing apparatus as in claim 1, the logic to compress color data via delta compression relative to a base color.

4. The graphic processing apparatus as in claim 1, the logic to determine whether color data to be compressed is compressible to a target compression ratio.

5. The graphic processing apparatus as in claim 4, the logic to determine whether color data to be compressed is losslessly compressible to the target compression ratio.

6. The graphic processing apparatus as in claim 4, the logic to bypass packing compressed bits of color data, wherein the color data is determined to be incompressible to the target compression ratio.

7. The graphic processing apparatus as in claim 4, the target compression ratio is a ratio between a cache line of the first cache memory and a memory bus coupled to the first cache memory.

8. The graphic processing apparatus as in claim 4, the target compression ratio is a ratio between a cache line of the first cache memory and a cache line of a second cache memory.

9. The graphics processing apparatus as in claim 8, wherein the first cache memory is a render cache and the second cache memory is a level three cache.

10. A method to manage a graphics processor cache, the method comprising:
    storing, in a render cache memory, render target data which is to be displayed by a display engine or used to render subsequent images for display;
    storing, in a victim cache memory communicatively coupled to the render cache memory, write back color data that is evicted from the render cache memory;
    selectively compressing the writeback color data evicted from the render cache memory to the victim cache memory selectively in response to a determination that the writeback color data can be compressed to a threshold compression level to generate compressed writeback color data for storage in a higher level cache memory communicatively coupled to the render cache memory and the victim cache memory via a memory bus.

11. The method as in claim 10, additionally comprising setting a control state for the writeback color data indicating a compressed state.

12. The method as in claim 10, additionally comprising bypassing compressing the second color data in response to determining the second color data is incompressible to the target compression ratio and writing uncompressed second color data to the memory bus.

13. The method as in claim 12, additionally comprising setting a control state for the second color data indicating an uncompressed state.

14. A system comprising:
    a first processor including one or more processor cores;
    a graphics processor coupled to the first processor on a same die, the graphics processor comprising:
    a render cache memory to store render target data which is to be displayed by a display engine or used to render subsequent images for display;
    a victim cache memory communicatively coupled to the render cache memory to store writeback color data that is evicted from the render cache memory;
    a memory bus coupled to the render cache memory and the victim cache memory;
    a higher level cache memory coupled to the memory bus; and
    logic coupled to the render cache memory, the victim cache memory, and to the memory bus to compress the writeback color data evicted from the render cache memory to the victim cache memory selectively in response to a determination that the writeback color data can be compressed to a threshold compression level to generate compressed writeback color data for storage in the higher level cache memory;
    a display controller coupled to the higher level cache memory via a bus, the display controller to read compressed color data from the higher level cache memory; and
    a display device to display output from the display controller.

15. The system as in claim 14, wherein the writeback color data output from the render cache memory is to be retrieved from the higher level cache memory through the memory bus for a successive render operation.

16. The system as in claim 14, the logic to determine whether color data to be compressed is compressible to a target compression ratio.

17. The system as in claim 14, the logic to bypass packing compressed bits of writeback color data, wherein the color data is determined to be incompressible to the target compression ratio.

18. The system as in claim 17, the logic to losslessly compress writeback color data evicted from the render cache and the victim data cache.

* * * * *